US011825306B2

(12) United States Patent
Austin et al.

(10) Patent No.: US 11,825,306 B2
(45) Date of Patent: Nov. 21, 2023

(54) PEER-TO-PEER SECURE COMMUNICATION SYSTEM, APPARATUS, AND METHOD

(71) Applicant: Cervais Inc., Ashburn, VA (US)

(72) Inventors: James A. Austin, Ashburn, VA (US); Tony J. Salman, Ashburn, VA (US)

(73) Assignee: Cervais Inc., Ashburn, VA (US)

( * ) Notice: Subject to any disclaimer, the term of this patent is extended or adjusted under 35 U.S.C. 154(b) by 0 days.

(21) Appl. No.: 18/015,171

(22) PCT Filed: Jul. 7, 2021

(86) PCT No.: PCT/US2021/040674
§ 371 (c)(1),
(2) Date: Jan. 9, 2023

(87) PCT Pub. No.: WO2022/011003
PCT Pub. Date: Jan. 13, 2022

(65) Prior Publication Data
US 2023/0199489 A1 Jun. 22, 2023

Related U.S. Application Data

(60) Provisional application No. 63/049,379, filed on Jul. 8, 2020.

(51) Int. Cl.
*H04W 12/069* (2021.01)
*H04W 12/033* (2021.01)
(Continued)

(52) U.S. Cl.
CPC ......... *H04W 12/069* (2021.01); *H04L 9/0825* (2013.01); *H04W 12/033* (2021.01); *H04W 12/04* (2013.01); *H04L 2209/80* (2013.01)

(58) Field of Classification Search
CPC . H04W 12/069; H04W 12/033; H04W 12/04; H04L 9/0825; H04L 2209/80
See application file for complete search history.

(56) References Cited

U.S. PATENT DOCUMENTS 10,250,588 B1 * 4/2019 Tarafdar ............. H04L 63/1466
10,771,244 B2 * 9/2020 Kim ..................... H04L 9/0825
(Continued)

OTHER PUBLICATIONS

International Search Report—PCT/US/2021/040674 dated Oct. 20, 2021—2 pages.
Written Opinion—PCT/US/2021/040674 dated Oct. 20, 2021—5 pages.

*Primary Examiner* — J. Brant Murphy
(74) *Attorney, Agent, or Firm* — K&L Gates LLP

(57) ABSTRACT

Methods, apparatuses and systems for peer-to-peer secure communication are disclosed. In an example, a mobile security apparatus ("MSA") is connected to a first endpoint device and includes a memory device storing a list of MSAs that are designated as being within a circle of trust ("CoT") of the MSA. The list includes an Internet Protocol ("IP") address, a public key, and an identifier of at least one endpoint device for each of the MSAs. The apparatus also includes a processor configured to receive a selection of content from the first endpoint device for transmission to the second endpoint device. After determining the second endpoint device corresponds to a second MSA that is included within the CoT, the processor encrypts a message including the content using the public key associated with the second MSA and transmits the encrypted message using the IP address of the second MSA.

20 Claims, 31 Drawing Sheets

(51) Int. Cl.
*H04L 9/08* (2006.01)
*H04W 12/04* (2021.01)

(56) References Cited

U.S. PATENT DOCUMENTS

| | | | |
|---|---|---|---|
| 11,375,369 B2* | 6/2022 | Wang | H04L 9/321 |
| 2005/0021964 A1* | 1/2005 | Bhatnagar | H04L 63/0823 |
| | | | 713/175 |
| 2008/0301779 A1* | 12/2008 | Garg | H04L 63/104 |
| | | | 726/4 |
| 2010/0107219 A1* | 4/2010 | Thompson | G06F 21/6245 |
| | | | 726/30 |
| 2011/0261787 A1* | 10/2011 | Bachmann | H04W 12/037 |
| | | | 370/331 |
| 2014/0289528 A1* | 9/2014 | Baghdasaryan | H04L 9/3297 |
| | | | 713/171 |
| 2016/0080380 A1* | 3/2016 | Dawoud Shenouda Dawoud | |
| | | | H04L 9/3236 |
| | | | 713/156 |
| 2016/0087957 A1* | 3/2016 | Shah | H04L 63/205 |
| | | | 726/1 |
| 2016/0105314 A1* | 4/2016 | Logue | H04L 12/2823 |
| | | | 726/4 |
| 2018/0227279 A1* | 8/2018 | Kim | H04W 12/069 |
| 2019/0036682 A1* | 1/2019 | Qiu | H04L 9/3265 |
| 2020/0266989 A1* | 8/2020 | Krcmaricic-Barackov | |
| | | | H04L 9/3213 |
| 2021/0209237 A1* | 7/2021 | Gurin | H04L 9/14 |

\* cited by examiner

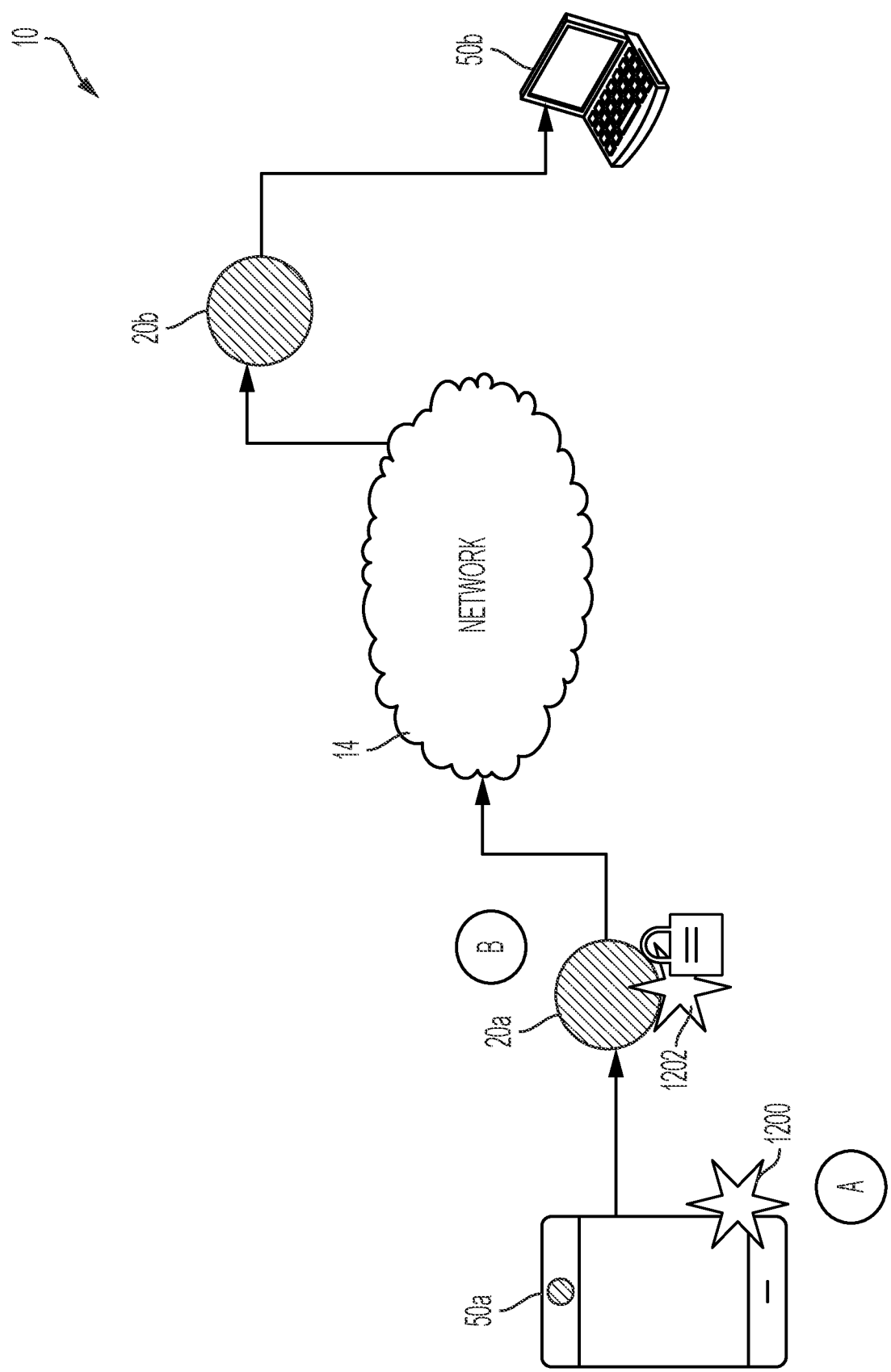

PEER-TO-PEER SECURE COMMUNICATION SYSTEM, APPARATUS, AND METHOD

PRIORITY CLAIM

This application is a national phase entry of PCT/US2021/040674, filed Jul. 7, 2021, which claims priority to U.S. Provisional Patent Application No. 63/049,379, filed Jul. 8, 2020, the entire disclosures of which are incorporated herein by reference.

TECHNICAL FIELD

The present disclosure relates generally to secure peer-to-peer communication, and in particular to cloud-connected secure gateways that provide transport layer security between designated endpoint devices.

BACKGROUND

As the world emerges from the SARS-CoV-2 pandemic, more people are choosing to work remotely. While established companies provide secure networks, such as virtual private networks, "VPNs", many people outside of these companies are left to communicate with others via public networks, leaving their data exposed to malicious applications. Additionally, network limitations caused by VPNs cause some employees to communicate with coworkers outside of the VPNs, thereby exposing confidential company information. Further, in some instances, malicious applications may gain access to devices on VPN, thereby bypassing the security of the VPN.

In addition to the increasing numbers of people working remotely, the number of connected devices is increasing exponentially. For instance, may Internet of Things ("IoT")-enabled devices (e.g., televisions, appliances, security/convenience devices, etc.) are configured with Bluetooth®, Zigbee™, and/or Wi-Fi compatibility to enable network access. Similarly, industry is seeing advances in machine-to-machine ("M2M") communication and machine learning. Organizations are accordingly increasingly seeking a seamless, reliable IoT cybersecurity solution for protecting data and endpoints. The desire has become critical due to the explosion of IoT adoption and remote working.

Malicious applications are increasingly targeting IoT and other remotely connected endpoint devices. The types of attacks vary, with the end goal of interfering with a user's device or compromising private information. For instance, direct access attacks enable an unauthorized application to gain access to a user's computer or smart device. Here, data can be copied, settings may be modified, and malicious software or listening devices may be installed. Network detection against direct access attacks may be bypassed using, for example, external drives such as Universal Serial Bus ("USB") drives that are plugged into a user's computer or smart device.

In another example, Denial-of-Service ("DoS") attacks render a computer network unavailable to its intended users. DoS attacks may block certain individuals or block all users of the network. The DoS attacks may be launched against multiple nodes along the network, making their remedy difficult. In yet another example, a backdoor or cryptosystem involves bypassing authentication or security controls. Backdoors or cryptosystems may be designed intentionally for a computer network to allow special access to authorized users. For example, special portals may be provided to allow service technicians to access connected devices for troubleshooting or to provide software updates. Of course, other backdoors or cryptosystems are developed maliciously by third parties. Regardless of the motive for their existence, backdoors create a vulnerability and can be very hard to detect. Privilege escalation is similar to a backdoor. Privilege escalation occurs when a malicious user with some level of restricted access is able (without authorization) to elevate their privilege or access level.

In a further example, eavesdropping involves listening to conversations or communications between different nodes of a computer network. Highly advanced eavesdropping techniques may monitor electromagnetic transmission generated by network nodes, which are generated despite the network being protected or even isolated electronically from the outside world.

Also, phishing attempts deceive users to gain sensitive information such as usernames, passwords, and credit card details. Phishing may be implemented by directing users to enter details at a fake website. Once entered, the sensitive information is used to gain access to the user's account on the real website. Social engineering is similar to phishing and occurs when an attacker or malicious application pretends to be someone of importance in an organization asking for personal company information, such as account numbers and passwords. The attacker may also pretend to be a bank or other authorized entity looking for information. Spoofing is also similar to phishing and involves an attacker providing falsification of data, such as a false username in an attempt to gain access to information or resources for malicious purposes.

Moreover, the risk of any of the above types of cybersecurity attacks becomes compounded as people increasingly comingle the operation of the same smart devices both at work and at home. Company-issued computers and smartphones are used for both work and personal reasons. The same smartphone used to exchange work emails is used to send personal emails and remotely control home appliances and entertainment devices. The same computer used to perform work functions is used to order items online and to trade personal stocks. A need accordingly exists for a system and method to provide cybersecurity that protects both home and workplace internet and other network-connected devices.

SUMMARY

The present system, apparatus, and method are directed to a device-based system that provides a compact, portable, smart security gateway, which provides protection from cyberattacks for the internet of things ("IoT") and other locally connected endpoint devices. The device in one embodiment is a mobile security apparatus that implements a "defense-in-depth" approach to protect user endpoint devices. The mobile security apparatus is configured to provide the capabilities to not only detect and defend against advanced attacks, but also to simplify the complexity of achieving complete device protection for consumer and organizations alike. The mobile security apparatus uses encryption of content for communication with other mobile security apparatuses to provide a private, secure, and authenticated transport layer security ("TLS") or similar, connection across public networks. The mobile security apparatus provides seamless, device management that enables a user to maintain complete control of how devices are protected. The mobile security apparatus provides the flexibility and capability to be used anywhere to protect user endpoint devices in even remote locations.

The mobile security apparatus disclosed herein provides complete endpoint protection capabilities, including the ability to establish trusted relationships and deliver enhanced security from scalable software attacks and common hardware attacks. The mobile security apparatus in an embodiment is configured to communicate with endpoint devices via Wi-Fi, Bluetooth®, cellular and other protocols, such as ZigBee™, LoRa and Wi-Fi 6.

The mobile security apparatus in one embodiment provides a compact, portable device that employs advanced data forensic detection and monitoring techniques to detect cyberattacks. The forensic detection in an embodiment includes software analytics to monitor and detect anomalies from inbound and outbound attack vectors associated with a user's endpoint device. The forensic detection in an embodiment also uses machine learning to identify, authenticate, and protect user endpoint devices. The mobile security apparatus in an embodiment also enables the user to create circle of trusts ("CoTs") for secure communications.

To enable secure communication among mobile security apparatuses with the same CoT, a centralized, cloud-based server manages public keys, Internet Protocol ("IP") addresses, and other identifying information for each registered, authenticated mobile security apparatus. To add a user to a CoT, a mobile security apparatus transmits a request to the server that identifies the user to be added. The identifier may specify the other user's endpoint device, their mobile security apparatus, a network address, or an electronic address. The server returns a public key, IP address, and/or identifier of the other mobile security apparatus. For the transmission of content to the other mobile security apparatus, the mobile security apparatus uses the public key of the other mobile security apparatus to encrypt the content. The mobile security apparatus then addresses the encrypted content using the IP address of the other mobile security apparatus. The other mobile security apparatus is then able to use its private key for decrypting the content, which is then routed to a specified endpoint device. This configuration provides a secure TLS connection for authenticated and private communications between mobile security apparatuses of the same CoT.

In light of the disclosure herein and without limiting the disclosure in any way, in a first aspect of the present disclosure, which may be combined with any other aspect, or portion thereof, a system for provisioning secure peer-to-peer communication between separate endpoint devices includes a server configured to maintain a data structure specifying credentials of mobile security apparatuses used for authentication. The system also includes a first mobile security apparatus communicatively coupled to the server via a first network connection and a second mobile security apparatus communicatively coupled to the server via a second network connection. The first mobile security apparatus is authenticated with the server via first credentials and is communicatively coupled to a first endpoint device via a first local connection. The second mobile security apparatus is authenticated with the server via second credentials and is communicatively coupled to a second endpoint device via a second local connection. The server is configured to store a registration of the first mobile security apparatus including a first Internet Protocol ("IP") address and a first public key and store a registration of the second mobile security apparatus including a second IP address and a second public key. The server is also configured to receive a request message from the first mobile security apparatus indicative of a request to add the second mobile security apparatus to a circle-of-trust for secure peer-to-peer communication and transmit a response message to the first mobile security apparatus including the second IP address and the second public key. The first mobile security apparatus is configured to use the second IP address and the second public key to include the second mobile security apparatus and the corresponding second endpoint device within a circle-of-trust group for the first mobile security apparatus. The first mobile security apparatus is also configured to receive content from the first endpoint device via the first local connection that is identified for transmission to the second endpoint device, determine the second endpoint device is associated with the second mobile security apparatus of the circle-of-trust group, and encrypt the content from the first endpoint device with the second public key. The first mobile security apparatus is further configured to transmit the content to the second mobile security apparatus via a network using the second IP address for authenticated and private peer-to-peer communication, causing the second mobile security apparatus to decrypt the content using a second private key and transmit the decrypted content to the second endpoint device.

In accordance with a second aspect of the present disclosure, which may be used in combination with any other aspect listed herein unless stated otherwise, the content includes at least one of a file, a short message service ("SMS") or text message, a multimedia messaging service ("MMS") message, a voice call, an audiovisual call, or an e-mail.

In accordance with a third aspect of the present disclosure, which may be used in combination with any other aspect listed herein unless stated otherwise, the first mobile security apparatus is further configured to receive encrypted second content from the second endpoint device via the second mobile security apparatus, determine the encrypted second content is from the second mobile security apparatus using a source IP address of the second content that matches the second IP address, decrypt the encrypted second content using the second public key, determine the second content is for the first endpoint device, and transmit the second content to the first endpoint device using the first local connection.

In accordance with a fourth aspect of the present disclosure, which may be used in combination with any other aspect listed herein unless stated otherwise, the circle-of-trust group of the first mobile security apparatus includes at least one additional endpoint device and associated mobile security apparatuses. Each mobile security apparatus of the circle-of-trust group corresponds to an IP address and a unique public key that is stored in the first mobile security apparatus for authenticated and private peer-to-peer communication.

In accordance with a fifth aspect of the present disclosure, which may be used in combination with any other aspect listed herein unless stated otherwise, the circle-of-trust group of the first mobile security apparatus is a first circle-of-trust group. The first mobile security apparatus stores at least one additional circle-of-trust group. Each additional circle-of-trust group is associated with at least one endpoint device and a corresponding mobile security apparatus.

In accordance with a sixth aspect of the present disclosure, which may be used in combination with any other aspect listed herein unless stated otherwise, the first network connection includes at least one of a wide area network connection or a cellular connection and the first local connection includes at least one of a Bluetooth®, a Zigbee™, a universal serial bus ("USB"), or a Wi-Fi connection, and the second network connection includes at least one of a wide area network connection or a cellular connection and the second local connection includes at least one of a Bluetooth®, a Zigbee™, a USB, or a Wi-Fi connection.

In accordance with a seventh aspect of the present disclosure, which may be used in combination with any other aspect listed herein unless stated otherwise, the first credentials include a first device serial number of the first mobile security apparatus associated with the first public key and the second credentials include a second device serial number of the second mobile security apparatus associated with the second public key.

In accordance with an eighth aspect of the present disclosure, which may be used in combination with any other aspect listed herein unless stated otherwise, the first mobile security apparatus is provisioned with a first private key and a first certificate that are used for authentication with the server through correspondence with the first credentials, and the second mobile security apparatus is provisioned with the second private key and a second certificate that are used for authentication with the server through correspondence with the second credentials.

In accordance with a ninth aspect of the present disclosure, which may be used in combination with any other aspect listed herein unless stated otherwise, the first and second credentials are transmitted to the server via a manifest file from a manufacturer of the first and second mobile security apparatuses.

In accordance with a tenth aspect of the present disclosure, which may be used in combination with any other aspect listed herein unless stated otherwise, the first credentials include a first signer and the first mobile security apparatus is provided with a first certificate that is signed by the first signer, and the second credentials include a second signer and the second mobile security apparatus is provided with a second certificate that is signed by the second signer.

In accordance with an eleventh aspect of the present disclosure, which may be used in combination with any other aspect listed herein unless stated otherwise, the first and second signers are the same signer.

In accordance with a twelfth aspect of the present disclosure, which may be used in combination with any other aspect listed herein unless stated otherwise, the server is configured to receive the second certificate from the second mobile security apparatus, determine the second mobile security apparatus cannot be authenticated because there is no registration on file, after determining authentication has failed, use a script to verify the second signer of the second certificate received from the second mobile security apparatus matches the second signer of the second credentials for providing just-in-time registration, and use the just-in-time registration to authenticate the second mobile security apparatus, enabling the server to transmit the second IP address and the second public key of the second mobile security apparatus to the first mobile security apparatus for inclusion in the circle-of-trust group.

In accordance with a thirteenth aspect of the present disclosure, which may be used in combination with any other aspect listed herein unless stated otherwise, the authentication includes transport layer security ("TLS") authentication.

In accordance with a fourteenth aspect of the present disclosure, which may be used in combination with any other aspect listed herein unless stated otherwise, a mobile security apparatus is connected to a first endpoint device and includes a memory device storing a list of mobile security apparatuses that are designated as being within a circle of trust of the mobile security apparatus, the list including an Internet Protocol ("IP") address, a public key, and an identifier of at least one endpoint device for each of the mobile security apparatuses. The mobile security apparatus also includes a secure element including a first private key and a processor communicatively coupled to the memory device and the secure element. The processor is configured to receive, from the first endpoint device, a selection of content and a selection of a second endpoint device, determine that the second endpoint device corresponds to a second mobile security apparatus that is included within the circle of trust, encrypt at least one message including the content using the public key associated with the second mobile security apparatus, and transmit the encrypted at least one message using the IP address of the second mobile security apparatus, causing the second mobile security apparatus to decrypt the at least one message for transmission to the second endpoint device.

In accordance with a fifteenth aspect of the present disclosure, which may be used in combination with any other aspect listed herein unless stated otherwise, at least one of the first endpoint device or the second endpoint device includes at least one of a computing device, a smartphone, a tablet computer, a laptop computer, an Internet-of-Things ("IoT") device, or appliance.

In accordance with a sixteenth aspect of the present disclosure, which may be used in combination with any other aspect listed herein unless stated otherwise, the content includes at least one of a file, a short message service ("SMS") or text message, a multimedia messaging service ("MMS") message, a voice call, an audiovisual call, or an e-mail.

In accordance with a seventeenth aspect of the present disclosure, which may be used in combination with any other aspect listed herein unless stated otherwise, the processor is additionally configured to receive at least one message from a third mobile security apparatus that lists the first mobile security apparatus within a circle of trust of the second mobile security apparatus, the at least one message encrypted with a public key associated with the mobile security apparatus, decrypt the at least one message using the private key stored within the secure element, determine the at least one message is to be routed to the first endpoint device, and transmit the at least one message to the first endpoint device.

In accordance with an eighteenth aspect of the present disclosure, which may be used in combination with any other aspect listed herein unless stated otherwise, the processor is additionally configured to receive at least one message from the second mobile security apparatus, the at least one message encrypted with a second private key associated with the second mobile security apparatus, decrypt the at least one message using the public key associated with the second mobile security apparatus, determine that the at least one message is to be routed to the first endpoint device, and transmit the at least one message to the first endpoint device.

In accordance with a nineteenth aspect of the present disclosure, which may be used in combination with any other aspect listed herein unless stated otherwise, the processor is additionally configured to communicate with the second mobile security apparatus using a transport layer security ("TLS") connection.

In accordance with a twentieth aspect of the present disclosure, which may be used in combination with any other aspect listed herein unless stated otherwise, the mobile security apparatus is connected to the first endpoint device via a local connection and is connected to the second mobile security apparatus via a network connection, and the network connection includes at least one of a wide area network connection or a cellular connection and the local connection includes at least one of a Bluetooth®, a Zigbee™, a universal serial bus ("USB"), or a Wi-Fi connection.

In a twenty-first aspect of the present disclosure, any of the structure and functionality disclosed in connection with FIGS. 1 to 13, or portions thereof, may be included or combined with any of the other structure and functionality disclosed in connection with FIGS. 1 to 13.

In light of the present disclosure and the above aspects, it is an advantage of the present disclosure to provide a device-based cybersecurity system having a compact, portable, smart security gateway, which provides data protection for the internet of things ("IoT").

It is another advantage of the present disclosure to provide a cybersecurity system and method having a "defense-in-depth" approach to protect user endpoint devices.

It is a further advantage of the present disclosure to provide a cybersecurity system and method that simplifies the complexity of achieving complete device protection for consumer and organizations alike.

It is still another advantage of the present disclosure to provide a cybersecurity system and method that includes the ability to establish trusted relationships between endpoint devices.

It is still a further advantage of the present disclosure to provide a mobile cybersecurity system and method that may be implemented anywhere and at all times.

Additional features and advantages are described in, and will be apparent from the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

FIGS. 12 and 13 are diagrams that illustrate an exchange of content between mobile security apparatuses, according to an example embodiment of the present disclosure.

DETAILED DESCRIPTION

Figure 1:
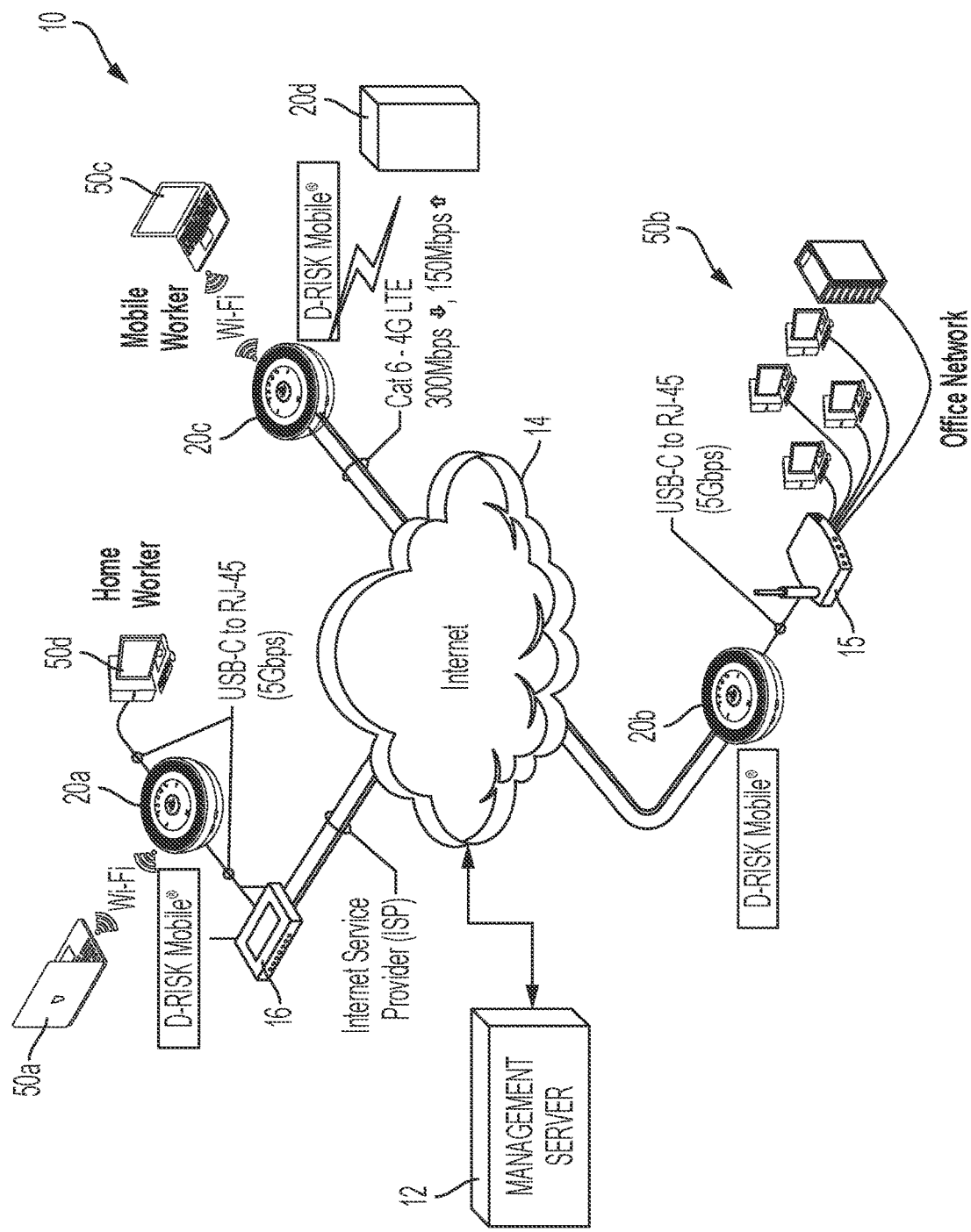
FIG. 1 is a diagram of an example peer-to-peer secure communication system including a management server and a plurality of mobile security apparatuses, according to an example embodiment of the present disclosure.

The system, methods, and apparatuses disclosed herein are directed to providing authenticated and secure peer-to-peer communications using a cloud-based service for provisioning. The systems, methods, and apparatuses use a specially configured secure gateway, referred to herein as a mobile security apparatus, to manage one or more groups of trusted devices or local networks. The systems, methods, and apparatuses enable a user to specify one or more other mobile security apparatuses that are to be part of a designated circle-of-trust ("CoT"). Once part of a CoT, a user is able to securely and privately transmit content from their endpoint device to endpoint devices of other users through private connections provisioned between their mobile security apparatuses.

To enable the creation of a CoT, the systems, methods, and apparatuses use a specially configured server that manages Internet Protocol ("IP") addresses and public keys of each registered and authenticated mobile security apparatus. A user adds a mobile security apparatus of another user to their CoT by causing their mobile security apparatus to transmit a request message to the server identifying the other user, their mobile security apparatus, and/or a related endpoint device. In response to the request message, the server transmits to the user's mobile security apparatus a response message that includes, for example, the public key and IP address of the requested mobile security apparatus. After receiving the IP address and public key, the mobile security apparatus of the other user is part of the user's CoT.

A user uses the CoT for communicating content, such as files, short message service ("SMS") or text messages, multimedia messaging service ("MMS"), voice calls, audio-visual calls, and/or or e-mails. A user selects a destination endpoint device (associated with a destination mobile security apparatus of another user) and causes their endpoint device to transmit selected content. This content is transmitted to the user's mobile security apparatus, which uses the public key of the destination mobile security apparatus. The user's mobile security apparatus then transmits the content to the destination mobile security apparatus, which decrypts the content using a private key. The destination mobile security apparatus then transmits the decrypted content to the other user's endpoint device, as requested by the user.

As provided in the above description, the systems, methods, and apparatuses use a server, such as a cloud based server for provisioning specifically configured gateways (e.g., the systems, methods, and apparatuses) to enable peer-to-peer authenticated and private communications. In some instances, the systems, methods, and apparatuses use TLS authentication for the peer-to-peer communication. The systems, methods, and apparatuses provide robust cybersecurity by bypassing centralized servers, content platforms communication platforms, and/or social media platforms, and instead create a direct Internet/cellular-based link between two endpoint devices (via respective mobile security apparatuses). Further, the systems, methods, and apparatuses are configured such that endpoint devices and/or systems, methods, and apparatuses do not share public keys with each other, which prevents malicious applications from obtaining public keys and interfering with communications. The disclosed specially configured server instead provides public keys to mobile security apparatuses that have been authenticated and registered. Further, the use of encryption between mobile security apparatuses of the same CoT prevents communications from being deciphered or hacked. Third party devices that do not communicate through a mobile security apparatus are unable to communicate with endpoint devices that are located behind mobile security apparatuses, providing a further layer of protection against potentially malicious devices that are outside of a user's CoT.

It should also be appreciated that the systems, methods, and apparatuses disclosed herein do not require specialized endpoint devices or software to facilitate the private and secure communications. At most, a user may install a management application on an endpoint device for configuring their own mobile security device. Such a configuration enables a user to communicatively couple virtually any device to a mobile security apparatus without any special provisioning. This enables, for example, IoT devices and/or any facility-based networked device to communicate through and receive the security benefits of the mobile security apparatuses disclosed herein.

In addition to providing authenticated and private communication, the mobile security apparatus may also provide vulnerability monitoring of connected devices, IoT asset management, website filtering and blocking, and malicious content scanning. The mobile security apparatus also enables a user to set parental control and/or configure firewall settings. The mobile security apparatus is configured as a mobile hotspot that provides Internet access and tethering for devices that may not have a network connection.

Reference is made herein to a CoT or circle-of-trust. As disclosed herein, a CoT is a designated group of endpoint devices with which a user may communicate content through respective authenticated mobile security apparatuses. A CoT is defined by a user such that other users of a CoT may each communicate with the user but not necessarily with each other. To communicate with each other, the other users would have to create their own CoT that includes the other users. A CoT is accordingly created from a perspective a user with the other users unaware of each other. Communication within a CoT may be through a transport layer security ("TLS") connection, a secure sockets layer ("SSL") connection, etc.

The mobile security apparatus is configured to enable a user to create more than one CoT. For example, a user may create a first CoT for coworkers, a second CoT for friends, and a third CoT for family. Each CoT includes at least one other user, and may include up to thousands of users. A user can only be part of a CoT if they have an authenticated and registered mobile security apparatus.

Users may link multiple endpoint devices (e.g., a smartphone, a tablet computer, a laptop computer, a television, etc.) to a mobile security apparatus 20. In these instances, a user selects which endpoint device(s) is permitted to be connected the mobile security apparatus 20. For example, if the user wanted to connect a wireless endpoint device 50 to their mobile security apparatus 20, before that wireless endpoint device 50 can officially connect to the mobile security apparatus 20, that wireless endpoint device 50 is scanned for potential system vulnerabilities. If the wireless endpoint device 50 is found to contain no system vulnerabilities by the mobile security apparatus 20, then the wireless endpoint device 50 will be allowed to connect to the mobile security apparatus 20. If vulnerabilities are found on the wireless endpoint device 50 through the initial vulnerability scan that was conducted, then the user will be obligated to mitigate all system vulnerabilities discovered, before the wireless endpoint device 50 will be allowed to connect to the mobile security apparatus 20.

Once the wireless endpoint device 50 is connected, a user may send content to another wireless endpoint device within a CoT. For example, selection of a phone number of another user causes content to be transmitted to the other user's smartphone as a SMS or text message via the mobile security apparatus 20. In another example, selection of another user's conferencing username causes a call session (e.g., content) to be transmitted to the other user's tablet computer and smartphone via the mobile security apparatus 20, where the other user may select one of their endpoint devices to answer the secure and private call.

Peer-to-Peer Secure Communication System Embodiment

FIG. 1 is a diagram of an example peer-to-peer secure communication system 10, according to an example embodiment of the present disclosure. In the illustrated example, the peer-to-peer secure communication system 10 includes three mobile security apparatuses 20a, and 20c that are communicatively connected to a management server 12 via a network 14. In other examples, the system 10 may include tens to hundreds or thousands/millions of mobile security apparatuses.

The example management server 12, discussed below in more detail, is configured to provide authentication and registration for the mobile security apparatuses 20a, and 20c. The example management server 12 enables a user to add other users to a CoT by distributing public keys, IP addresses, and/or any other networking information to a requesting mobile security apparatus 20.

FIG. 1 shows that the mobile security apparatuses 20 are connected to the management server 12 via the network 14, which may include any wide area network ("WAN"), cellular network, or combinations thereof. The mobile security apparatuses 20 are configured as gateways for connectivity to the network 14. For instance, the mobile security apparatus 20b is shown as being connected to the network 14 via a Category 6 cable for an Ethernet Connection. In other examples, the mobile security apparatuses 20 may include a cellular and/or digital subscriber line ("DSL") connection to the network 14. In these examples, the mobile security apparatuses 20b and 20c are configured to convert data from a cellular or Internet protocol into Wi-Fi, Ethernet, or other local network protocol. As shown, the mobile security apparatus 20b is upstream of a local router/switch 15.

FIG. 1 also shows that the mobile security apparatuses 20 may be provisioned behind a gateway device. For example, a gateway device 16 is connected between the mobile security apparatus 20a and the network 14. The gateway device 16 is configured to convert communications received over the network 14 from a cellular, Ethernet, DSL, etc., protocol to an Ethernet or other local networking protocol. As shown in FIG. 1, the gateway device 16 is connected to the mobile security apparatus 20a via a USB-C connection.

The example peer-to-peer secure communication system 10 also includes endpoint devices 50 (collectively referring to devices 50a to 50n). As disclosed herein, an endpoint devices 50 include any device that is configured to generate/transmit communications/data and/or receive communications/data from any other endpoint device. As shown in FIG. 1, the endpoint devices 50 may include a laptop computer endpoint devices 50a and 50c, a desktop computer endpoint device 50d, or a cluster of endpoint devices 50b that are connected to the mobile security apparatus 20b via one or more routers/switches 15. Endpoint devices 50 may also include smartphones, smartwatches, smart eyewear, video game consoles, appliances, smart speakers, lighting control systems, etc.

In some embodiments, mobile security apparatuses 20 may be communicatively coupled together separate from the network 14. For example, the mobile security apparatus 20c is connected to a mobile security apparatus 20d via a Bluetooth®, Zigbee™, LoRA, or Wi-Fi connection. Such a configuration enables the secure sharing of files, text messages, audio and/or video calling over local networks or direct connections.

As shown in FIG. 1, the mobile security apparatus 20 may be assigned an IP address for receiving communications via the network 14. The mobile security apparatus 20 maintains a record, list, or data structure of media access control ("MAC") addresses, hardware addresses, or other addresses assigned to be communicatively coupled endpoint devices 50. The mobile security apparatus 20 uses the addresses of the endpoint devices 50 to manage how inbound communications and data are to be routed.

The example mobile security apparatus 20 is configured to provide local connectivity for the endpoint devices 50 via Wi-Fi, RJ-45, Ethernet, Bluetooth®, Zigbee™, LoRa, etc. Accordingly, the mobile security apparatus 20 is configured as a mobile hot-spot that provides authenticated and private communications for users in any location. For example, the mobile security apparatus 20 may be connected to a public Wi-Fi network, which is generally unsafe. However, the encryption and virtual connection created among mobile security apparatuses 20 within a CoT prevents the communication of data and other content from being interfered with or otherwise compromised.

Management Server Embodiment

Figure 2:
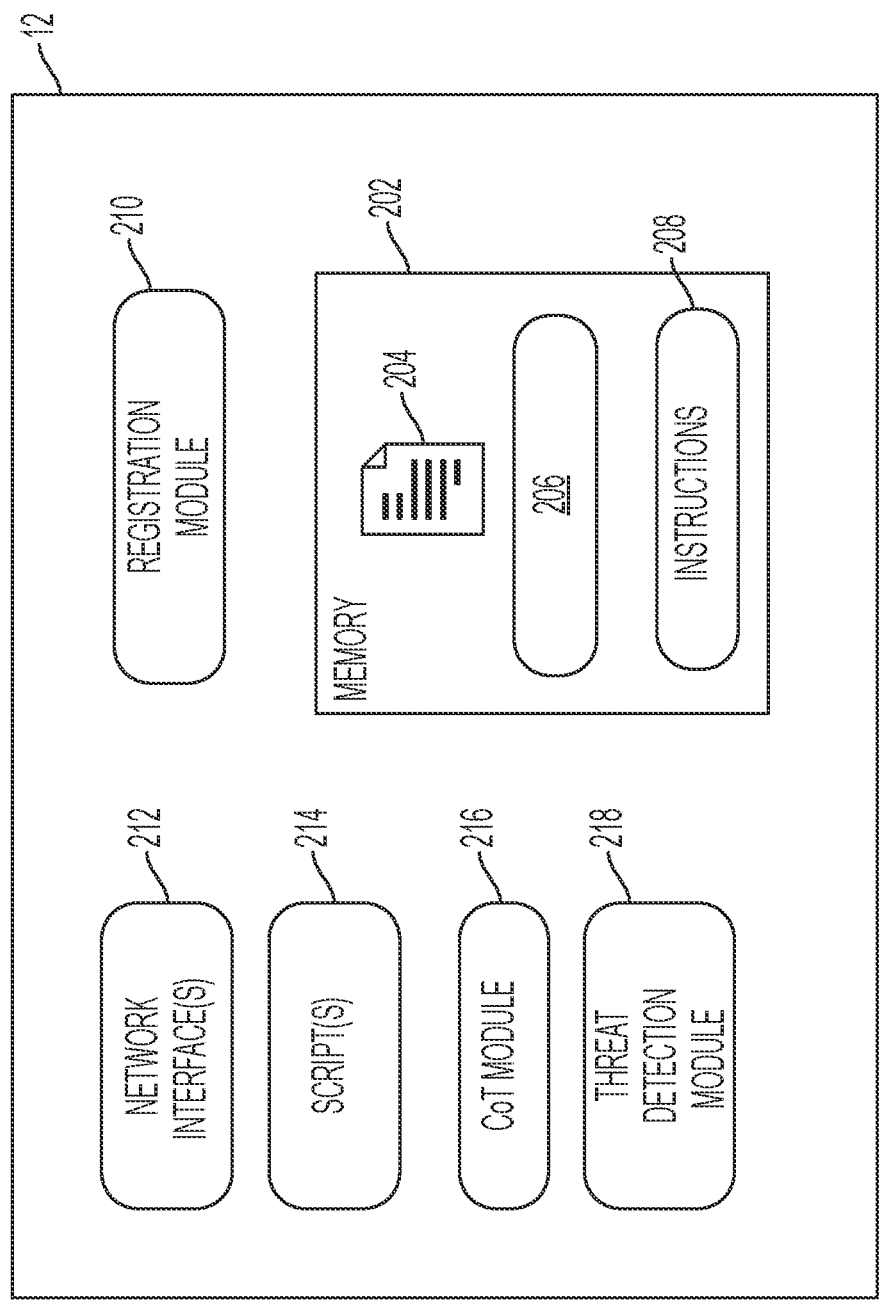
FIG. 2 is a diagram of the management server of FIG. 1, according to an example embodiment of the present disclosure.

FIG. 2 is a diagram of the management server 12 of FIG. 1, according to an example embodiment of the present disclosure. The example management server 12 is configured to provide registration and authentication for the mobile security apparatus 20. The management server 12 includes a memory device 202, such as a solid state drive ("SSD") or hard disk drive ("HDD"). In other examples, the server 12 is communicatively coupled to a separate memory device 202. In some instances, the server 12 and the memory device 202 are implemented via Amazon® Web Services ("AWS") in a cloud computing environment.

The example memory device 202 is configured to maintain a record as to which mobile security apparatuses 20 are registered and/or authenticated. The memory device 202 may include manifest file or data structure 204 that provides a one-to-one mapping of serial numbers of each mobile security apparatus 20 to a corresponding public key (each mobile security apparatus 20 is provided with a private key). The manifest file 204 may be received in the management server 12 from a manufacturer of the mobile security apparatuses 20.

In another embodiment, the manifest file 204 may include a signer for TLS authentication. The signer is registered to a cloud service provided by the management server 12. In some instances, one signer may be used for all mobile security apparatuses 20. Alternatively, a signer associated with a user of each mobile security apparatus 20 is created.

The memory device 202 also includes a registration data structure 206, which is configured to store registrations of mobile security apparatuses 20. The registration data structure 206 may store a username, password, IP address, MAC address, account information, etc., associated with each mobile security apparatus 20. The registration data structure 206 also stores an indication as to which public key is associated with each mobile security apparatus 20. The registration data structure 206 may further store indications as to which of the mobile security apparatuses 20 are authenticated.

The memory device 202 also stores machine-readable instructions 208. The instructions specify one or more algorithms, routines, or operations performed by the management server 12. The instructions may also specify one or more user interface for managing an account related to a mobile security apparatus 20. The management server 12 executes the instructions 208 to perform registration and/or authentication of each mobile security apparatus 20. References herein to the management server 12 performing certain operations refers to execution of the instructions 208.

The example management server 12 of FIG. 2 includes a registration module 210 for registering and/or authenticating mobile security apparatuses 20. The registration module 210 registers a mobile security apparatus 20 by confirming that a certificate is valid and matches credentials stored on the manifest file 204. The registration module 210 may, for example, compare a MAC address or serial number specified on a certificate with MAC addresses and/or serial numbers specified in the manifest file 204. If there is a match, and registration has not yet occurred, the registration module 210 registers the mobile security apparatus 20. To register, the registration module 210 stores the MAC address, serial number, or other identifying information to the registration data structure 206. The registration module 210 also stores a public key, an identifier of a public key, or a link to a public key specified by the manifest file 204. In some embodiments, the registration module 210 may request additional registration information from the mobile security apparatus 20 including a username, password, IP address, and/or user information.

In alternative embodiments, the management server 12 performs just-in-time registration by comparing a signer of a certificate to a list of signers within the manifest file 204. If there is a match between signers, the management server 12 verifies the certificate and registers the corresponding mobile security apparatus 20. The signer may correspond to an operator of the management server 12 or an individual user.

In addition to registration, the registration module 210 also authenticates the mobile security apparatuses 20. In an example, the registration module 210 is configured to perform TLS authentication, which uses the certificate of the mobile security apparatuses 20. If the certificate is registered, the registration module 210 performs authentication to create a secure connection with the mobile security apparatus 20 over TLS. The registration module 210 may also store an indication of a successful authentication in an entry or record for the mobile security apparatus 20 that is stored in the registration data structure 206.

The management server 12 includes one or more network interfaces 212 for communicating with the mobile security apparatuses 20. The network interfaces 212 may include an application programming interface ("API") that is assigned an IP address. At activation, the mobile security apparatuses 20 use a pre-stored IP address to transmit a registration request message to the management server 12. The network interfaces 212 may also include an API for receiving a request message to add another mobile security apparatus 20 to a CoT.

Figure 3:
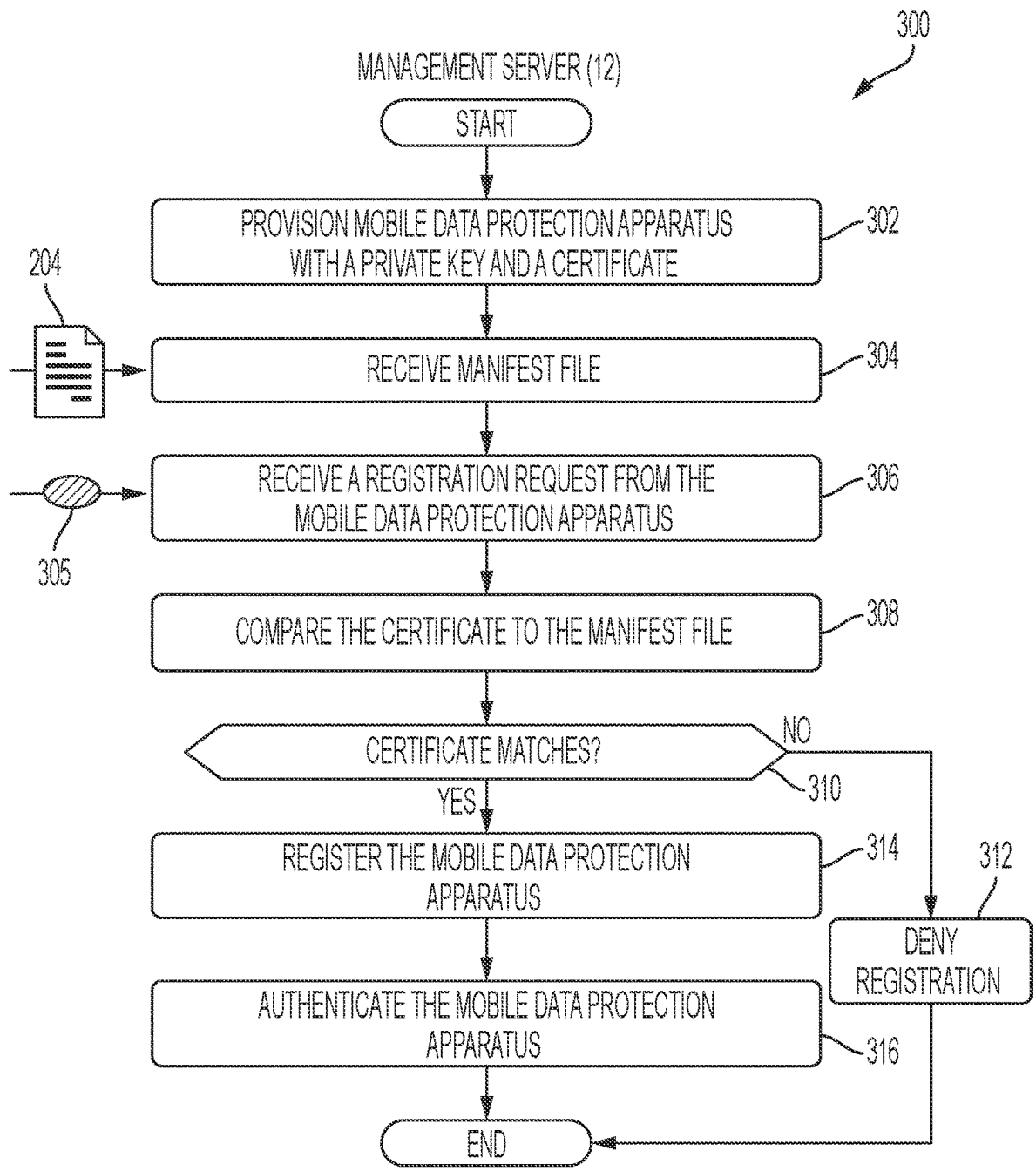
FIG. 3 is a flow diagram of an example procedure for registering and/or authenticating a mobile security apparatus using the management server, according to an example embodiment of the present disclosure.

FIG. 3 is a flow diagram of an example procedure 300 for registering and/or authenticating a mobile security apparatus 20 using the management server 12, according to an example embodiment of the present disclosure. Although the procedure 300 is described with reference to the flow diagram illustrated in FIG. 3, it should be appreciated that many other methods of performing the steps associated with the procedure 300 may be used. For example, the order of many of the blocks may be changed, certain blocks may be combined with other blocks, and many of the blocks described may be optional. The actions described in the procedure 300 are specified by one or more instructions 208 and may be performed among multiple devices including, for example, the management server 12, the memory device 202, and/or the mobile security apparatus 20.

The example procedure 300 begins when a mobile security apparatus 20 is provisioned with a private key and a certificate (block 302). The mobile security apparatus 20 may be provisioned by a manufacturer. The example management server 12 then receives a manifest file 204, which is stored in the memory device 202 (block 304). The manifest file 204 may be provided by a manufacturer of the mobile security apparatus 20. As discussed above, the manifest file 204 provides a one-to-one mapping of serial numbers between mobile security apparatuses 20 and public keys.

After the manifest file 204 is stored, the management device 12 receives a request message 305 from a mobile security apparatus 20 (block 306). The request message 305 includes a source IP address and/or a serial number. The request message 305 may also include a copy of the certificate. The request message 305 may be part of an activation procedure performed by the mobile security apparatus 20, such as a sign-in to an AWS™ account as a Greengrass device. The management server 12 compares information from the request message 305 to the manifest file 204 (block 308). The management server 12, for example, compares the certificate to a public key or serial numbers to verify the mobile security apparatus 20 can be registered. If there is not a match to the information within the manifest file 204 (block 310), the management server 12 is configured to deny registration (block 312). The management server 12 may cause an error message to be displayed on the requesting mobile security apparatus 20 to indicate the registration failure. The example procedure 300 then ends.

However, if there is a match to the information within the manifest file 204 (block 310), the management server 12 is configured to register the mobile security apparatus 20 (block 314). Registration may include storing a copy of the certificate to the registration data structure 206. Registration may also include receiving and storing to the registration data structure 206 information related to the mobile security apparatus 20 and/or a corresponding user. The information may include an address, a name, a username, a password, etc. In some embodiments, the management server 12 causes the mobile security apparatus 20 to display a prompt for receiving the information from a user. In other instances, upon activation, the mobile security apparatus 20 prompts the user for the information, which is then transmitted to the management server 12. In other embodiments, the registration information may be received in the management server 12 from the user during a purchase or account registration of the mobile security apparatus 20.

After registration, the management server 12 authenticates the mobile security apparatus 20 (block 316). The management server 12 may use TLS mutual authentication using the certificate and/or public key. Once authentication is successful, the management server 12 stores an indication of the success authentication to the registration data structure 206. At this point, the mobile security apparatus 20 is listed in the management server 12 as an authenticated and registered device that is available for inclusion in a CoT. The example procedure 300 then ends.

Figure 4:
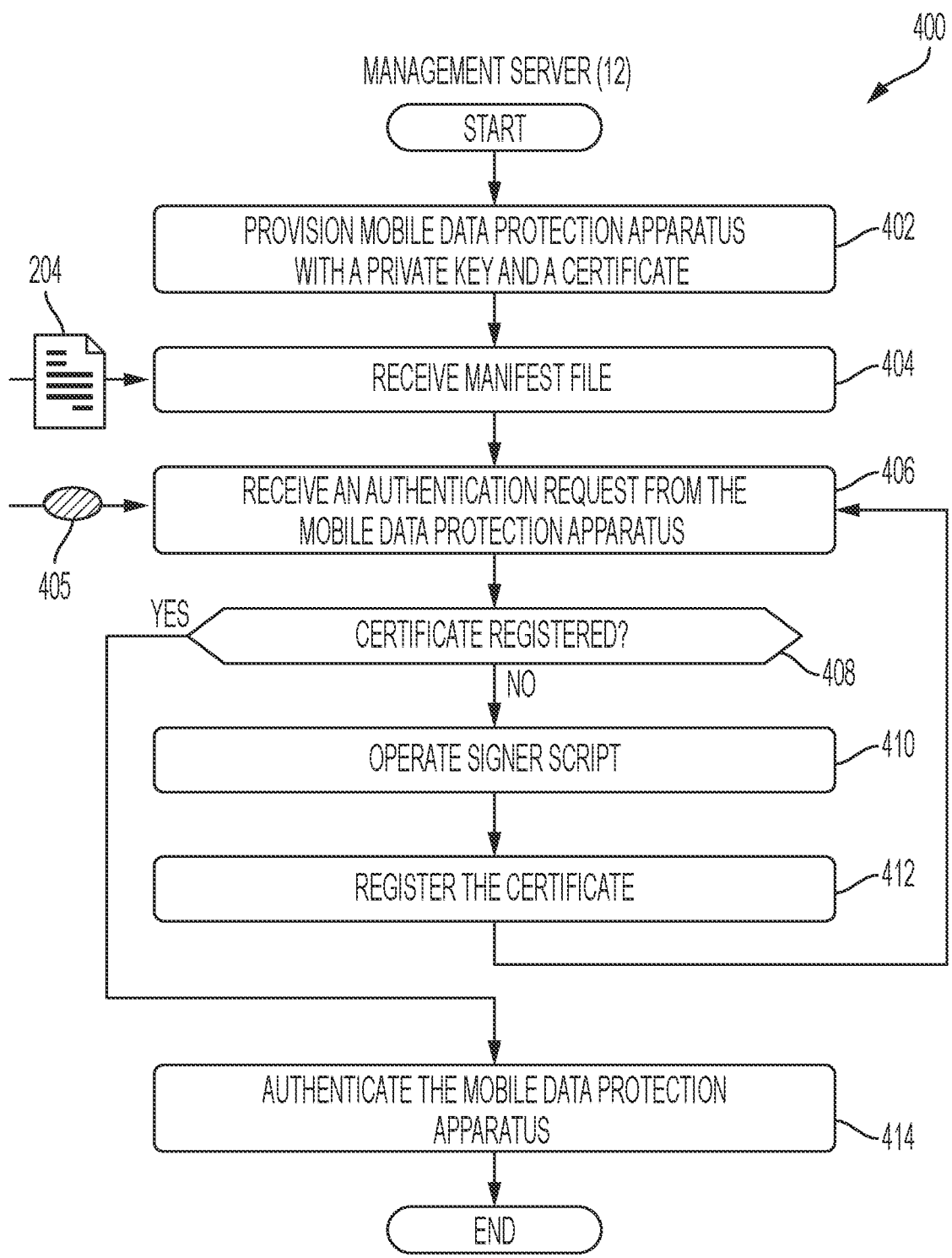
FIG. 4 is a flow diagram of another example procedure for just-in-time registering and/or authenticating a mobile security apparatus using the management server, according to an example embodiment of the present disclosure.

FIG. 4 is a flow diagram of another example procedure 400 for just-in-time registering and/or authenticating of a mobile security apparatus 20 using the management server 12, according to an example embodiment of the present disclosure. Although the procedure 400 is described with reference to the flow diagram illustrated in FIG. 4, it should be appreciated that many other methods of performing the steps associated with the procedure 400 may be used. For example, the order of many of the blocks may be changed, certain blocks may be combined with other blocks, and many of the blocks described may be optional. The actions described in the procedure 400 are specified by one or more instructions 208 and may be performed among multiple devices including, for example, the management server 12, the memory device 202, and/or the mobile security apparatus 20.

The example procedure 400 begins when a mobile security apparatus 20 is provisioned with a private key and a signed certificate (block 402). The mobile security apparatus 20 may be provisioned by a manufacturer. The example management server 12 then receives a manifest file 204, which is stored in the memory device 202 (block 404). The manifest file 204 may be provided by an operator of the management server 12 or a manufacturer of the mobile security apparatus 20. The manifest file 204 includes a signer for each provisioned certificate. The signer may be the same signer or a separate signer for each unique user.

After the manifest file 204 is stored, the management device 12 receives a request message 405 from a mobile security apparatus 20 (block 406). The request message 405 includes a source IP address and/or a serial number. The request message 405 may also include a copy of the certificate. Similar to FIG. 3, the request message 405 may be part of an activation procedure performed by the mobile security apparatus 20, such as a sign-in to an AWS' account as a Greengrass device.

The management server 12 determines if the certificate is registered (block 408). If the certificate is not registered, the management server 12 causes the registration to fail and a script 214 to be operated (block 410). As shown in FIG. 2, the script 214 is part of the management server 12 and is configured to perform a specially configured operation. The script 214 may include a Lambda script. The example script 214 is configured to compare a signer of the certificate provided by the mobile security apparatus 20 to signers in the manifest file 204. In this example, the script 214 verifies that the presented certificate is signed by the same signer in the account specified by the manifest file 204. Once this verification is performed, the management server 12 registers the certificate (block 412). The management server 12 stores the registration to the registration data structure 206 of the memory device 202. The management server 12 may also prompt or otherwise receive other registration information, as discussed above in connection with FIG. 3.

The management server 12 receives a new authentication request message 405 from the mobile security apparatus 20 (block 406). Now that the mobile security apparatus 20 is registered, the management server 12 performs, for example, TLS authentication with the mobile security apparatus 20 to provide for a secure connection over TLS. The mobile security apparatus 20 is now listed in the management server 12 as an authenticated and registered device that is available for inclusion in a CoT. The example procedure 400 then ends.

Referring again to FIG. 2, the management server 12 includes a CoT module 216 that handles CoT requests from mobile security apparatuses 20. The CoT module 216 is configured to determine which mobile security apparatus 20 corresponds to a request, and provides the appropriate IP address and public key to a requesting mobile security apparatus 20. In some instances, the CoT module 216 may also transmit the IP address and public key of the requesting mobile security apparatus 20 to the requested mobile security apparatus 20.

It should be appreciated that the management server 12 does not itself maintain lists of CoT in one embodiment. Instead, each mobile security apparatus 20 manages their own CoT lists. This decentralized approach prevents a malicious application from accessing the management server 12 to be included within a CoT. Further, since each mobile security apparatus 20 is registered and authenticated, communication with the server 12 occurs over a secure TLS connection. Such configuration ensures that the CoT module 216 is only capable of communicating with registered and authenticated mobile security apparatuses 20. Communications received outside of the TLS connections do not reach the CoT module 216 or are otherwise disregarded.

Figure 5:
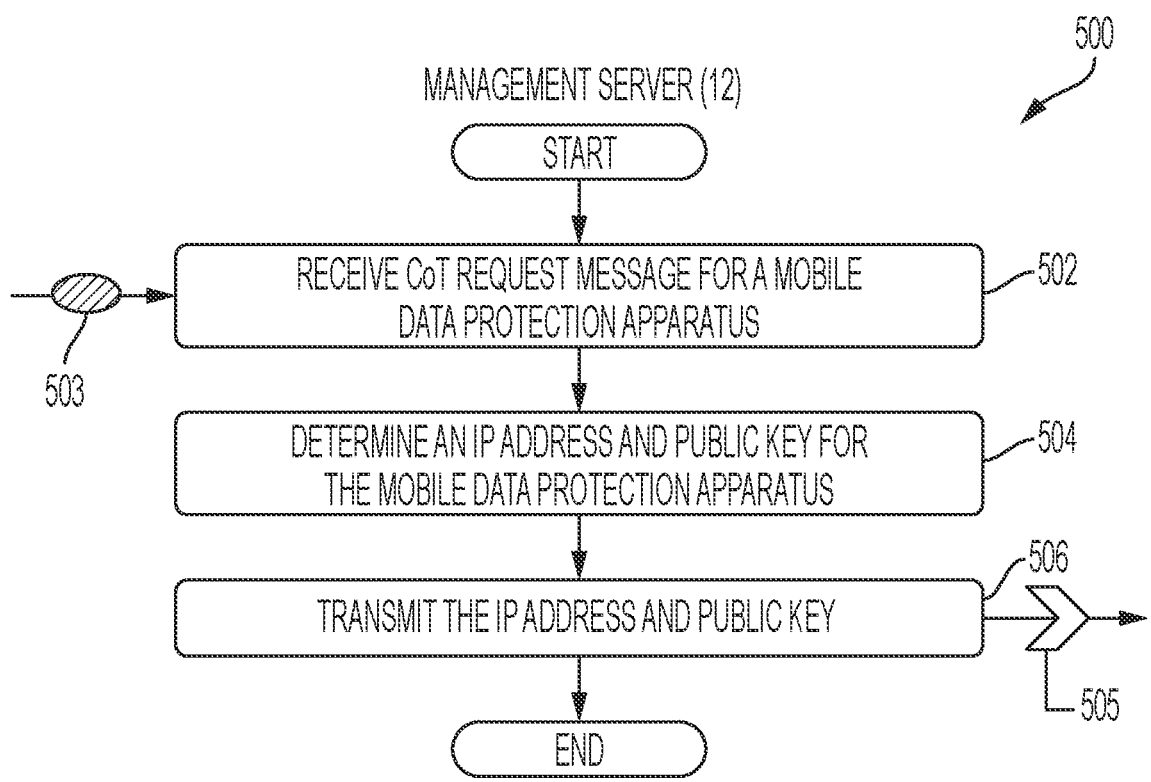
FIG. 5 is a flow diagram of another example procedure for adding a mobile security apparatus to a CoT using the management server, according to an example embodiment of the present disclosure.

FIG. 5 is a flow diagram of another example procedure 500 for adding a mobile security apparatus 20 to a CoT using the management server 12, according to an example embodiment of the present disclosure. Although the procedure 500 is described with reference to the flow diagram illustrated in FIG. 5, it should be appreciated that many other methods of performing the steps associated with procedure 500 may be used. For example, the order of many of the blocks may be changed, certain blocks may be combined with other blocks, and many of the blocks described may be optional. The actions described in the procedure 500 are specified by one or more instructions 208 and may be performed among multiple devices including, for example, the management server 12, the memory device 202, and/or the mobile security apparatus 20.

Procedure 500 begins when the management server 12 receives a request message 503 via a secure connection from a first mobile security apparatus 20 (block 502). The request message 503 identifies a user and/or a second mobile security apparatus 20 to which a user of the first mobile security apparatus 20 wants to add to a CoT. The request message 503 may include, for example, a username, a password, a name, a screenname, a phone number, a serial number, or any other identifier of the other user or second mobile security apparatus 20.

In some embodiments, the request message 503 may initiate a search request. For example, a user of the first mobile security apparatus 20 may use a search tool on the first mobile security apparatus 20 or an application on an endpoint device 50 to submit search terms or search strings such as names, usernames, identifiers, geographic locations, etc. The CoT module 216 of the management server 12 receives the request and performs a search of registration information in the registration data structure 206 accordingly. The CoT module 216 then returns search results to the first mobile security apparatus 20 for display on a user interface or to the endpoint device 50 for display. The user of the first mobile security apparatus 20 may select one of the search results (e.g., the second mobile security apparatus 20 or the related user), which is transmitted to the management server 12 as another request message 503.

After making a match, the management server 12 then determines an IP address and/or a public key associated with the second mobile security apparatus 20 or the related user (block 504). The IP address and public key information are stored in the registration data structure 206 of the memory device 202. The management server 12 then transmits a response message 505 to the first mobile security apparatus 20 (block 506). The response message 505 includes at least the IP address and the public key of the second mobile security apparatus 20. In some instances, the response message 505 includes additional registration information of the user including a name, geographic location, username, etc. The first mobile security apparatus 20 is configured to use the public key for encrypting content for the second mobile security apparatus 20, which is decrypted by the second mobile security apparatus 20 using its private key. Further, the first mobile security apparatus 20 uses the IP address for specifying a destination address of the encrypted content. The first and second mobile security apparatuses 20 may then communicate via a secure peer-to-peer connection over the network 14 to exchange content.

Once registered, the mobile security apparatuses 20 provide encryption for point-to-point (or peer-to-peer) files, messages, and other information transmitted between endpoint devices 50 having mobile security apparatuses 20 that are within the same CoT. After having the response message 505 enabling the mobile security apparatuses 20 to communicate within a CoT is transmitted, the example procedure 500 ends.

Referring again to FIG. 2, the example management server 12 includes additional modules for security and convenience features. For example, the management server 12 includes a threat detection module 218. In an example, threat detection module 218 incorporates a modeling framework that employs a continuous authentication and predictive analysis ("CAPA") engine, the core of which manages an extensive array of machine learning algorithms. With CAPA, threat detection module 218 applies predictive analytics to enforce and detect anomalies from inbound attack vectors and to neutralize any threats. CAPA manages an extensive array of artificial intelligence algorithms to detect and mitigate cyber threats.

In some instances, the threat detection module 218 monitors for anomalies regarding devices attempting to register and/or authenticate via the registration module 210. The threat detection module 218 may also monitor for anomalies regarding attempts to access the CoT module 216 to obtain IP addresses, identifiers, and/or public keys of mobile security apparatuses 20. Further, the threat detection module 218 may receive messages from mobile security apparatuses 20 regarding anomalous access attempts form third-party applications and devices. The threat detection module 218 may alternatively or additionally coordinate the sharing of real-time threat information externally with the mobile security apparatuses 20. The threat detection module 218, in one embodiment, is configured in a feature-rich agent framework that makes split-second decisions to classify the characteristic of a network object against optimally-configured statistical models.

The threat detection module 218 may alternatively or additionally provide antivirus threat management for enterprises of all sizes (e.g., IoT, agriculture, home, education, energy, government, health, transportation, retail and technology). Artificial intelligence is provided at the heart of the threat detection module 218 to proactively detect and prevent malicious software from gaining access to any of the enterprises that are part of the peer-to-peer secure communication system 10. The threat detection module 218 may alternatively or additionally provide advanced data forensics and monitoring techniques, including real-time events, process initiation, file system changes, and Windows® registry alterations.

In some embodiments, the management server 12 may include a module for providing and using blockchain technology to provide scalable, seamless auto provisioning of IoT devices incorporating identification, authentication and authorization ("IA$^2$"). The blockchain architecture is also configured to handle the approval of transactions based on various levels of network consensus to provide a spectrum of trust to data consumers.

Mobile Security Apparatus Embodiment

Figure 6:
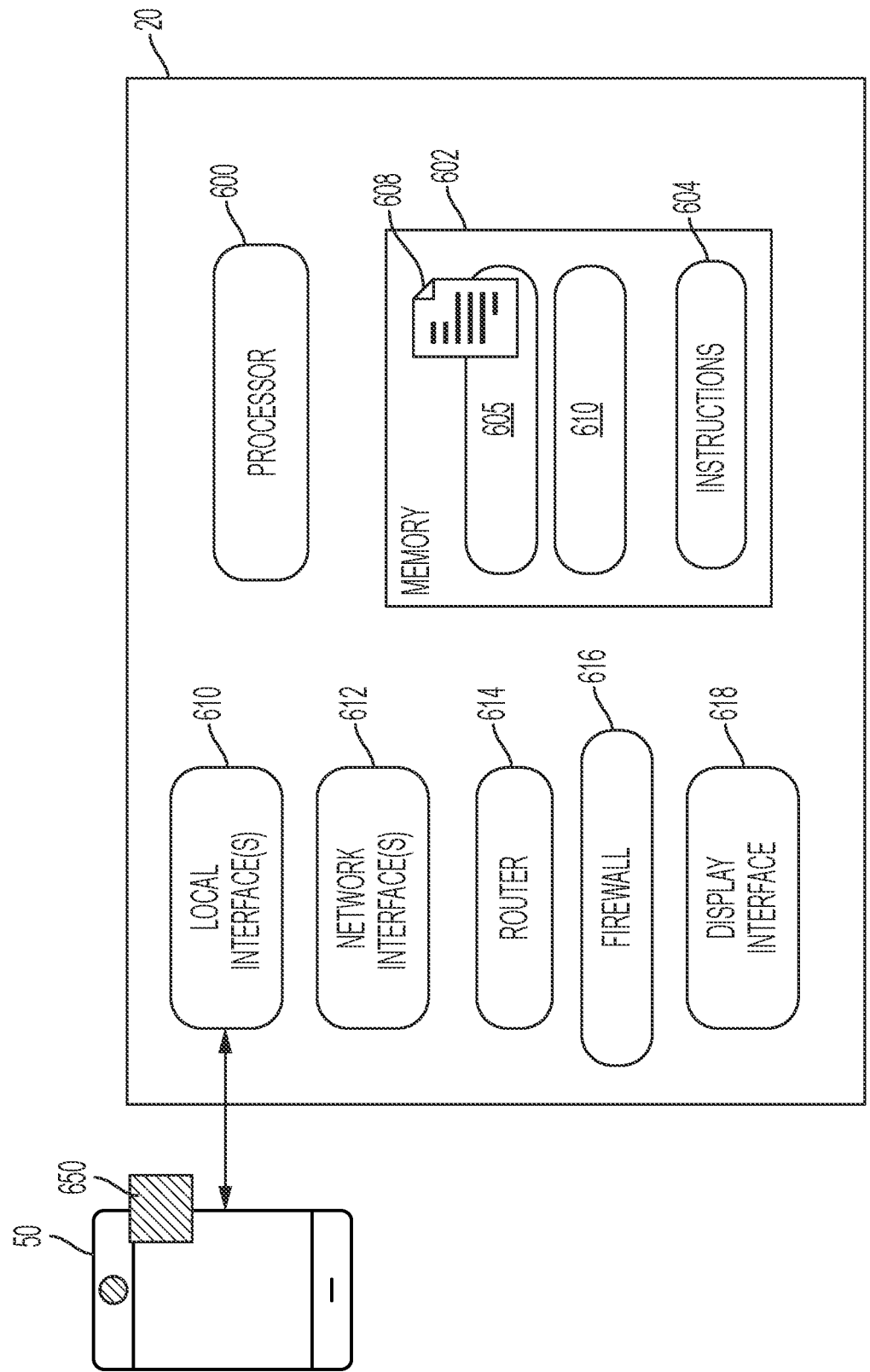
FIG. 6 is a diagram of the mobile security apparatus of FIG. 1, according to an example embodiment of the present disclosure.

FIG. 6 illustrates a diagram of the mobile security apparatus 20 of FIG. 1, according to an example embodiment of the present disclosure. The mobile security apparatus includes a processor 600 and a communicatively coupled memory device 602. The processor 600 may include any computing device including a microcontroller, a logic controller, an application specific integrated circuit ("ASIC"), etc. The memory device 602 may include any type of data storage device including an SSD, an HDD, etc.

The memory device 602 stores machine-readable instructions 604. The instructions specify one or more algorithms, routines, or operations performed by the processor 600. The instructions may also specify one or more user interfaces for the mobile security apparatus 20. The processor 600 executes the instructions 604 for management and communication via one or more CoTs. Reference herein to the mobile security apparatus 20 performing certain operations refers to the processor 600 executing the instructions 604.

The memory device 602 also includes a secure element component 605 that is configured to store credentials 608 for registration and/or authentication. The credentials 608 may include a private key and/or a certificate. The credentials 608 may be stored to the secure element component 605 as read-only data at a time of manufacture or activation.

The secure element component 605 may include an IoT hardware secure element. The secure element component 605 is configured to provide cryptographic authentication between apparatuses 20 in a CoT. In some instances, the secure element component 605 may operate with processor 600 to provide AES and/or SHA hardware encryption/decryption of messages transmitted between endpoint devices 50 within the same CoT. The processor 600 and/or secure element component 605 may provide military-level encryption with quantum number generation.

In some embodiments, the secure element component 605 in connection with the processor 600 is configured to enable a user to change an encryption strength. For example, the secure element component 605 enables a user to select between Level 1 security that provides an encryption of 256 bits, Level 2 security that provides an encryption of 512 bits, and Level 3 security that provides an encryption of 1024 bits. The secure element component 605 may include separate private keys for each security level. Further, the management server 12 may maintain public keys for each security level. A change to a security level by a user may cause the processor 600 to transmit a message to the management server 12 indicating the selected security level. In response, the management server 12 updates which public key is transmitted to other mobile security apparatuses 20 when the mobile security apparatus 20 is added to a CoT. The management server 12 may also transmit the different public key to other mobile security apparatuses 20 that already have a different public key for the mobile security apparatus 20.

The memory device 602 also includes a registration data structure 610 that is configured to maintain a list of local connected endpoint devices 50. The list may include a MAC address, local network address, device identifier, phone number, or any other identifying information. A user may use the mobile security apparatus 20 and/or an application on an endpoint device 50 to add an endpoint device 50 to the list. In other embodiments, a user may use an interface at an endpoint device 50 to enter a password or other credentials for connecting with the mobile security apparatus 20, such as connecting via a Wi-Fi connection. In still other examples, an endpoint device 50 may self-register with the mobile security apparatus 20 after being connected via, for example, a USB connection.

The processor 600 may be configured to perform device discovery and fingerprinting to create a list of local endpoint devices 50. The processor 600 may provide monitoring details of the locally connected endpoint device 50 including monitoring of firmware, the operating system, device name, MAC address, etc. The monitoring enables the mobile security apparatus 20 to manage and assess which endpoint devices 50 are connected.

The processor 600 may make the local endpoint devices 50 listed in the registration data structure 610 available for viewing to other endpoint devices 50 that are within a CoT. A user of one of the other endpoint devices 50 may browse the list to select a local endpoint device 50 for receiving content. For example, a user may want to transmit content to another user's television, which is listed as an endpoint device 50. The user uses a display of their mobile security apparatus 20 and/or an application on their endpoint device 50 to browse a list of endpoint devices 50 associated with the other user. Upon selection, the user's endpoint device 50 transmits the content to the television endpoint device 50 through the secure connection provided by the respective mobile security apparatuses 20.

The example registration data structure 610 may also store CoT lists. The processor 600 enables a user to create multiple CoTs. For each CoT, the processor 600 enables a user to select an endpoint device 50 and/or mobile security apparatus 20 of another user. Selection may include selecting or entering a phone number, a network address, a MAC address, a username, or any other device identifier. The registration data structure 610 is configured to store this information within the CoT to enable communication with the designated endpoint devices 50.

As discussed above in connection with FIG. 5, after a user selects an endpoint device 50 and/or a mobile security apparatus 20, the processor 600 transmits a request message 503 to the management server 12. In response, the management server 12 transmits an IP address and a public key of the requested mobile security apparatus 20. The processor 600 stores the IP address and public key (and any other network address or identification information) to the registration data structure 610. For subsequent content transmissions directed to the endpoint device 50, the processor 600 uses the registration data structure 610 to select the appropriate public key for encryption and IP address for transmission to the corresponding mobile security apparatus 20 via, for example, a TLS connection.

The example mobile security apparatus 20 also includes one or more local interfaces 610 that provide for local communicative coupling with endpoint devices 50. The local interfaces 610 may include a Wi-Fi interface, an Ethernet interface, a Bluetooth® interface, a Zigbee™ interface, and/or a LoRa interface. In the illustrated example, an endpoint device 50 is connected to a Wi-Fi local interface 610. In some embodiments, the local interface 610 is configured to provide a local Wi-Fi hotspot. The local interfaces 610 are configured as transceivers to convert data and other communications from a local communicative protocol to a data format for processing by the processor 600.

The mobile security apparatus 20 of FIG. 6 also includes one or more network interfaces 612 that provide for network communicative coupling with the network 14 of FIG. 1. The interfaces 612 may include an Ethernet interface, a cellular interface, a DSL interface, etc. The network interfaces 612 are configured as transceivers to convert data and other communications from the processor 600 into a format for transmission across the network 14.

The mobile security apparatus 20 further includes a router 614. The example router is configured to manage the transmission of content, data, and other communications to one or more locally connected endpoint devices 50. In some embodiments, an incoming message from the network 14 may identify a phone number, MAC address, or other identifier. The router 614 uses the registration data structure 610 to determine which locally connected endpoint device 50 is to receive the content, communications, data, etc.

The mobile security apparatus 20 may also include a firewall 616. In some embodiments, the firewall 616 is configured to enable a user to set certain permissions or restrictions of inbound content. A user may set via the firewall 616, for example, certain permission controls to block adult-oriented websites. A user may also use the firewall 616 to block the reception of content from certain endpoint devices 50 and/or other mobile security apparatuses 20 by identifying IP addresses and/or MAC addresses to block.

In some embodiments, the firewall 616 is configured to monitor traffic passing through for malicious data and other threats. The firewall 616 may operate advanced data forensic detection software, which may employ any one or more of blockchain technology, continuous authentication and predictive analysis ("CAPA"), data sharing with other mobile security apparatuses 20 (and/or the management server 12), and/or malware hardening (advanced endpoint protection ("AEP")), etc., to provide advanced cybersecurity. Thus, even if a malicious endpoint device becomes part of a CoT, the firewall 616 is configured to block the reception of malicious content or malicious access events. After detecting malicious content, the firewall 616 may identify and add a source endpoint device 50 and/or the corresponding mobile security apparatus 20 to a block list. The firewall 616 may also suspend or remove the compromised mobile security apparatus 20 from a CoT or provide an indication that the user should take actions to remove the mobile security apparatus 20 from a CoT.

In some embodiments, the mobile security apparatus 20 may include additional modules that operate in connection with the processor 600 to perform additional security or convenience operations. For example, a module may provide vulnerability management that identifies vulnerabilities and provides recommended mitigation. The module may use an open source vulnerability scanning tool to perform device vulnerability scanning. The module in conjunction with the processor 600 may perform unauthenticated testing, authenticated testing, various high level and low level Internet and industrial protocol monitoring, and performance tuning for large-scale scans. When an endpoint device 50 (i.e., an IoT device) attempts to initially connect to the mobile security apparatus 20, the processor 600 conducts a vulnerability scan. The memory device 602 may include a vulnerability database that is linked to a cloud master vulnerability database in the management server 12, which uses daily updated and comprehensive feeds from an open source vendor or national vulnerability database.

The example mobile security apparatus 20 also includes a display interface 618. As described herein, the display interface 618 includes a display screen for displaying one or more menus for configuring CoTs and/or local endpoint devices 50. The display screen may also display network status information such as data usage, average upload/download speeds, etc. The display interface 618 may also include a touchscreen input device for receiving user inputs. In some instances, the input buttons may be provided adjacent to or in combination with the display interface 618 for receiving user inputs.

Figure 7:
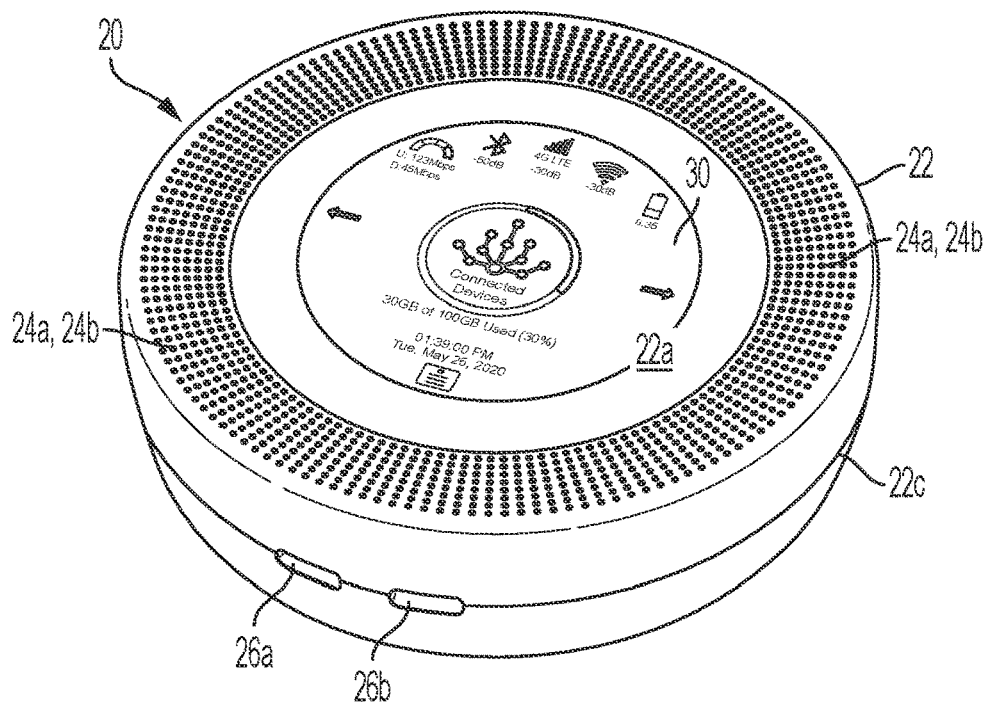
FIGS. 7 and 8 illustrate the mobile security apparatus of FIGS. 1 and 6, according to an example embodiment of the present disclosure.
Figure 8:
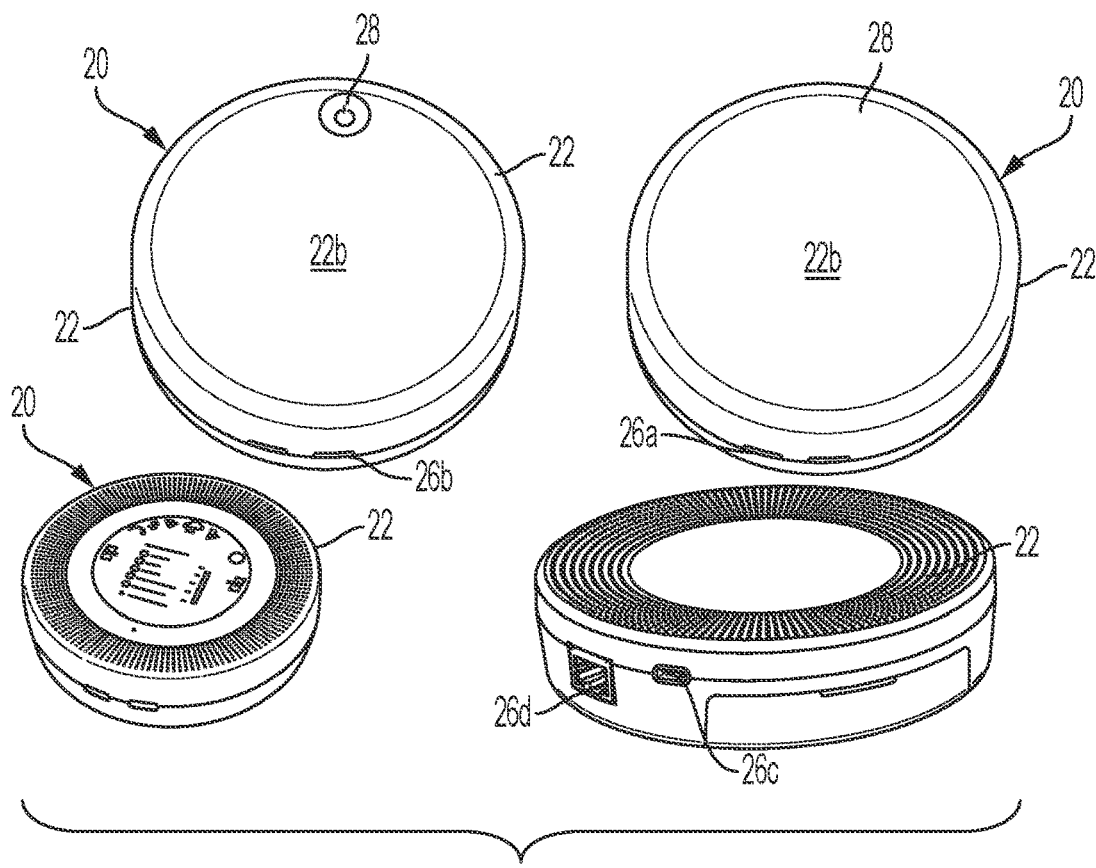

FIGS. 7 and 8 illustrate the mobile security apparatus 20 of FIGS. 1 and 6, according to example embodiments of the present disclosure. The mobile security apparatus 20 includes a housing 22, which may be made (e.g., molded or formed) of any suitable plastic and/or metal, e.g., polyvinylchloride ("PVC") polyethylene ("PE"), polyurethane ("PU"), or polycarbonate ("PC"), acrylonitrile butadiene styrene ("ABS"), stainless steel, steel, and/or aluminum. The housing 22 includes a top surface 22a and a bottom surface 22b separated by a sidewall 22c, and may be generally circular in shape. The housing 22 may be on the order of five inches (12.7 cm) in diameter, is light weight (e.g., five ounces), and is accordingly readily transportable.

The top surface 22a includes a display 30 (e.g., part of the display interface 618 of FIG. 6) for providing information to the user. The display 30 may for example be 2.1 inches (5.3 cm) in diameter and have 480×480 resolution. The display 30 in one embodiment includes a touchscreen overlay for entering information into the processor 600 of the mobile security apparatus 20. One or more electromechanical input device, such as a membrane switch, may also be provided. The top surface 22a in the illustrated embodiment also provides one or more speakers 24a, which operate with the processor 600 of the mobile security apparatus 20 to output audio information to the user. The mobile security apparatus 20 may also include one or more microphones 24b operating with the processor 600 for accepting voice commands from the user.

The illustrated embodiment of FIGS. 7 and 8 shows that sidewall 22c includes input ports 26a and 26b, which may be provided for providing wired data and/or signal communication with the endpoint devices 50 and/or the network 14.

The ports 26a and 26b may also be provided for outputting signals and/or data, e.g., to a user's headphones or earphones. The ports 26a and 26b in one example include at least two USB-C (3.0) ports, which support hardwired transmission rates up to 5 Gbps. The sidewall 22c may also include another USB-C (3.0) port 26c, which supports Qualcomm® Quick Charge 3.0 and/or an Ethernet RJ45 interface 26d.

In the illustrated embodiment, the bottom surface 22b includes an on/off button or switch 28 that enables the user to power and unpower the electronics of the mobile security apparatus 20. The example mobile security apparatus 20 includes a battery, which is charged via the charging port 26a or 26b, and which powers the electronics of the mobile security apparatus 20 when the button or switch 28 is switched on. The battery in one example provides 5000 mAh for up to twenty-four hours and allows for external charging.

In various embodiments, the mobile security apparatus 20 may have any one or more or all of the following additional technical features: (i) operate on an Android OS 10.0 operating system, (ii) include an Octa-core ARM Cortex-A53 64-bit CPU @2.0 GHz performance) application processor, (iii) include an Adreno 506 with 64-bit addressing, designed for 600 MHz, graphics processing unit ("GPU"), (iv) include a 16 GB eMMC+2 GB LPDDR3 memory, (v) operate via 802.11a/b/g/n/ac 2.4 GHz/5 GHz—Max 433 Mbps Wi-Fi, (vi) operate via BT4.2 LE 2402 MHz-2480 MHz Bluetooth, (vii) operate via Cat 6 FDD: Max 300 Mbps (DL)/Max 50 Mbps (UL) cellular communication, (viii) operate via B2/B4/B5/B7/B12/B13/B14/B17/B25/B26/B66/B71 long term evolution ("LTE") bands, (ix) operate via Wi-Fi mesh networking speeds of up to 3.3 Gbps (Wi-Fi6 Adapter), (x) include unlimited CoT connections, up to 50 or more simultaneous client connections, (xi) include dual subscriber identification module ("SIM") cards, e.g., one internal and one external, and (xii) provide security features including AES and SHA hardware encryption, secure boot, firmware signature, content protection, and/or Key Management.

FIGS. 9A to 9D illustrate example screens displayed by the touchscreen display 30 of the mobile security apparatus 20 of FIGS. 1, 6, 7, and 8, according to an example embodiment of the present disclosure. Each screen of FIGS. 9A to 9D includes a selectable forward button 32a and a back button 32b for navigating through the functionality, e.g., presented selectable options, of the mobile security apparatus 20. An indicator 34a represents a present data speed for the mobile security apparatus 20, e.g., displaying in megabytes per second for data uploading ("U") and downloading ("D") through the mobile security apparatus 20. An indicator 34b represents a present Bluetooth® connection. An indicator 34c represents a present cellular data network strength indication. An indicator 34d represents a present Wi-Fi network strength indication. An indicator 34e is a battery charge remaining indicator. A selectable button 36 is menu button.

Figure 9A:
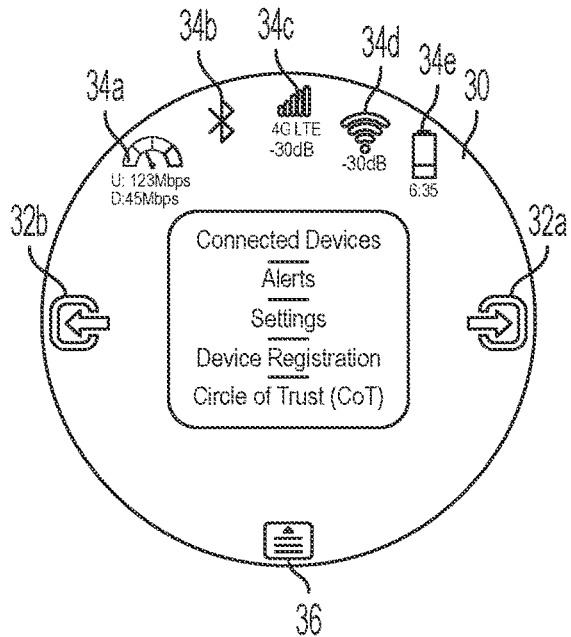
FIGS. 9A to 9D illustrate example screens displayed by the mobile security apparatus of FIGS. 1, 6, 7, and 8, according to an example embodiment of the present disclosure.

The home screen of FIG. 9A illustrates example selectable options provided by the mobile security apparatus 20. In the illustrated embodiment, a user is able to select to enter one or more submenu on the display 30 showing further details concerning which locally connected endpoint devices 50 are currently being protected by the mobile security apparatus 20. The user is also able to see any current alerts and to view and change any current settings related to the mobile security apparatus 20. The user is further able to enter a device registration submenu, which registers the mobile security apparatus 20 and/or an endpoint device 50 with the management server 12 and/or a cloud service. The user may also select to enter submenus concerning the user's CoT's.

Figure 9B:
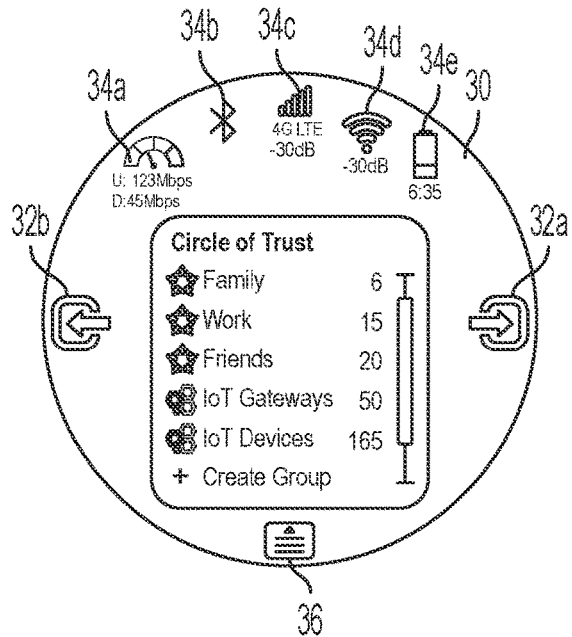

FIG. 9B illustrates a CoT screen, which is displayed after the user has selected the CoT option in FIG. 9A. The CoT screen displays the user's currently existing CoT's. The numbers next to the CoT names represent a total number of endpoint devices 50 associated with each group within the CoT. The vertical sliding bar enables the user to scroll to view additional CoT's. The CoT screen also provides an option for adding new CoT's.

Figure 9C:
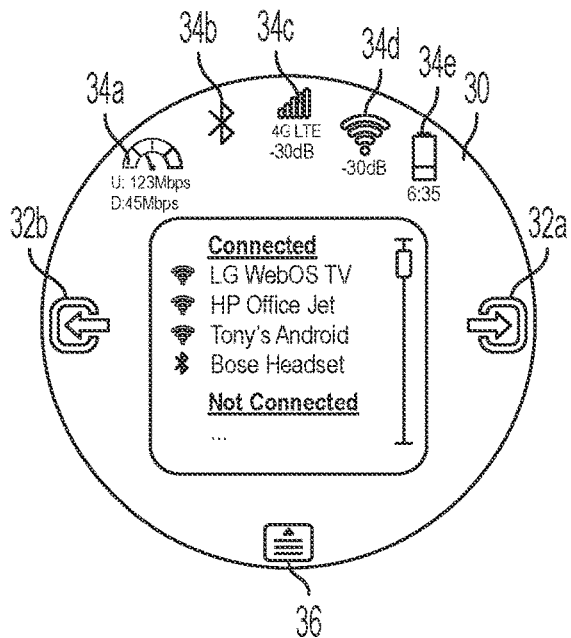

FIG. 9C illustrates a connected endpoint device 50 screen, which is displayed after the user has selected the Connected Devices option in FIG. 9A. The connected endpoint device screen illustrates all of the endpoint devices 50 presently connected to and protected by the mobile security apparatus 20. A scroll bar is again provided to view additional connected endpoint devices 50. The connected endpoint device screen in the illustrated embodiment also shows the endpoint devices 50 that are registered in the mobile security apparatus 20, but which for whatever reason are not currently connected to a network.

Figure 9D:
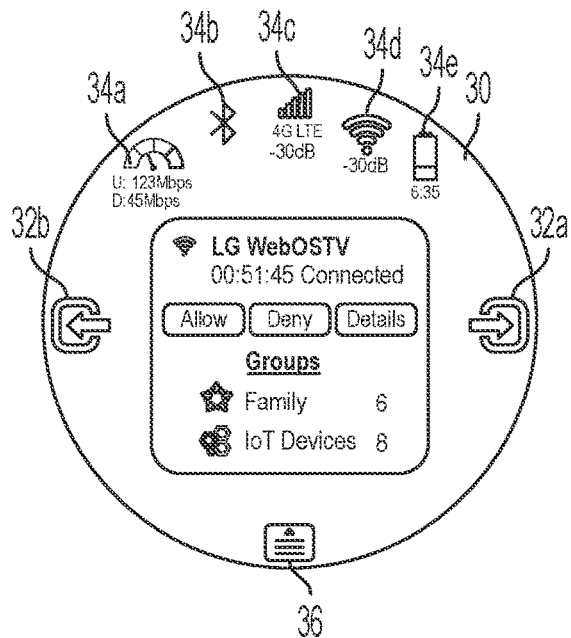

FIG. 9D illustrates a particular connected endpoint device 50, in the example a smart television LG® WebOS TV, which is displayed after the user selects that particular endpoint device 50 in FIG. 9C. Here, the display 30 of the mobile security apparatus shows that smart television LG® WebOS TV is part of two CoT's and provides "Allow", "Deny", and "Details" options for the smart television LG® WebOS TV to enable the smart television to be added or denied for the CoT.

Figure 10:
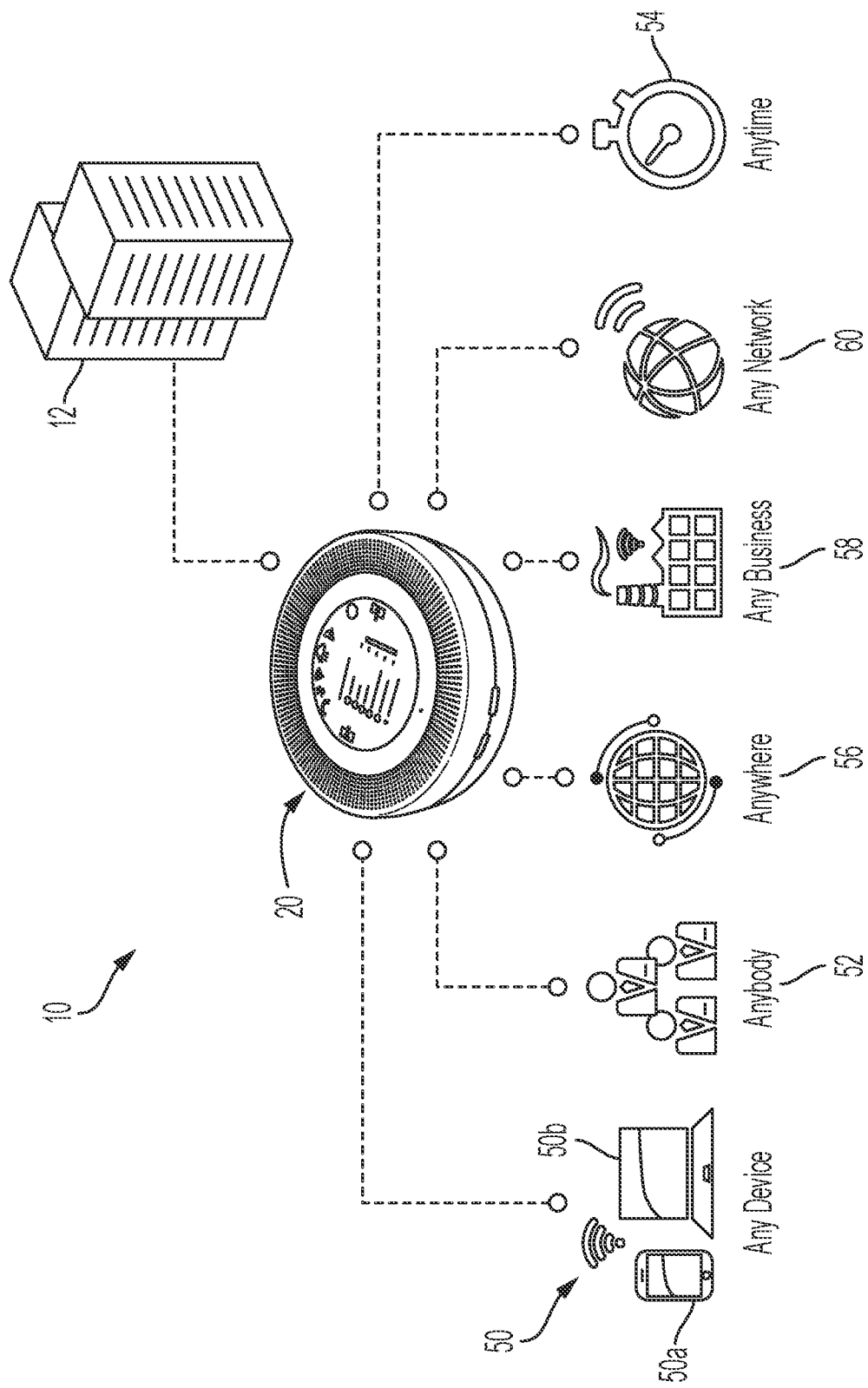
FIG. 10 is a diagram that shows an operability of the mobile security apparatus with the peer-to-peer secure communication system of FIG. 1, according to an example embodiment of the present disclosure.

FIG. 10 illustrates a diagram that shows an operability of the mobile security apparatus 20 with the peer-to-peer secure communication system 10 of FIG. 1, according to an example embodiment of the present disclosure. The illustration shows that the mobile security apparatus 20 is connectable to any device that the user desires to add to the system. As illustrated in more detail below, the mobile security apparatus 20 enables the user to create different CoT's, e.g., one or more work CoT, a family CoT, a friend CoT, a club or hobby CoT, etc. The mobile security apparatus 20 provides cybersecurity against information, e.g., email or text (e.g., short messaging service ("SMS") or multimedia messaging service ("MMS")) communications from any outside source 52, at any time 54, anywhere 56 across any network 60. The mobile security apparatus 20 is also compatible with any business 58. Many businesses have data protection systems in place. For example, a business may provide its own virtual private network ("VPN"). The mobile security apparatus 20 operates seamlessly within the VPN once a user's smart endpoint device 50a or personal computer endpoint device 50b gains authorized access to the VPN. The mobile security apparatus 20 is then subject to any restraints imposed by the VPN. For example, any website prohibited by the VPN remains prohibited and does not become unblocked via the mobile security apparatus 20.

Application Embodiment

Referring again to FIG. 6, an endpoint device 50 is locally connected to the mobile security apparatus 20 via the local interface 610. In this example, the endpoint device 50 includes an application 650 that is configured to provide remote management of the mobile security apparatus. The application 650 may include an enterprise application, a web application, or a mobile application. The application 650 is defined by one or more instructions stored in a memory of the endpoint device 50. Execution of those instructions by at least one processor of the endpoint device 50 causes the endpoint device 50 to perform the operations described herein regarding remote management of the mobile security apparatus 20. In some embodiments, the application 650 may include user interfaces provided by the management server 12 and displayed on a web browser.

The application 650 is configured to communicate with the processor 600 of the mobile security apparatus 20 for CoT and device management. The application 650 displays one or more graphical interfaces that prompt a user for endpoint device information and/or CoT information. The application 650 transmits the input information to the connected processor 600 of the mobile security apparatus 20 to configure the corresponding setting (e.g., an encryption security level) or store information to the memory device 602. In some instances, the application 650 is configured to communicate with one or more APIs managed by the processor 600 for communicating the information.

The example application 650 is also configured to receive status information from the processor 600 regarding operation of the mobile security apparatus 20. The status information may indicate network upload/download speeds, detected vulnerabilities, and/or identification of received content. The status information may also indicate information about different CoTs configured for the mobile security apparatus 20.

Figure 11A:
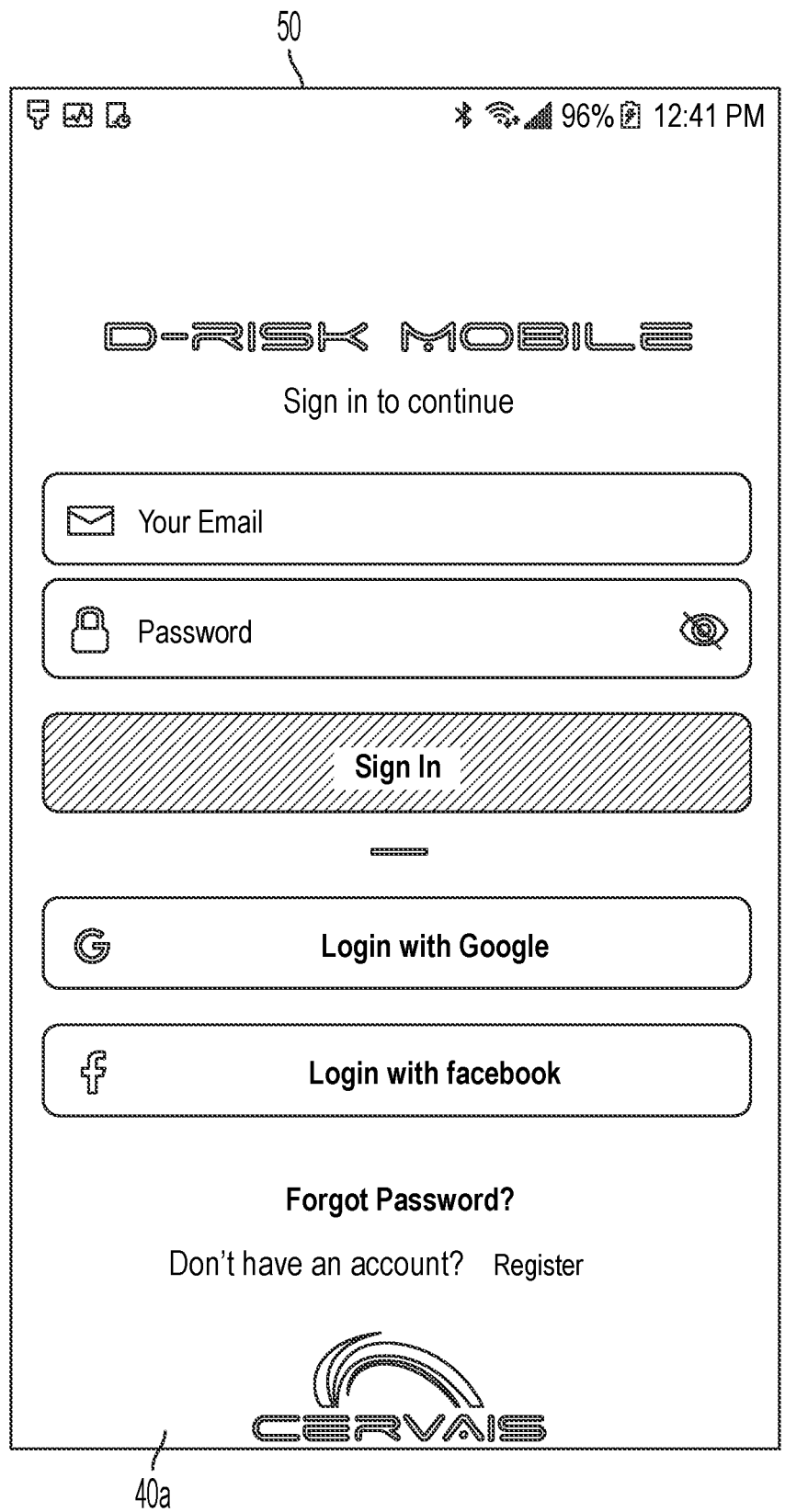
FIGS. 11A to 11T show sample user interfaces of an application on an endpoint device for interfacing with a mobile security apparatus, according to an example embodiment of the present disclosure.

FIGS. 11A to 11M illustrate sample user interfaces of the application 650 on a smart endpoint device 50, according to an example embodiment of the present disclosure. The application 650 may replicate the information provided at the display 30 and/or compliment the information provided at the display 30 of the mobile security apparatus 20. The application 650 monitors local endpoint devices 50 that are connected to the mobile security apparatus 20 and to manipulate the mobile security apparatus 20 as desired. FIG. 11A illustrates that the application 650 may, for example, provide a login screen 40*a*, which enables a user to open the application 650 and enter settings of the mobile security apparatus 20 in a protected manner. In the illustrated embodiment, the user enters a registered email address and a password. It is contemplated to also require a second stage of authentication in which the management server 12 and/or the mobile security apparatus 20 sends a code to the user to enter into login screen 40*a*.

Figure 11B:
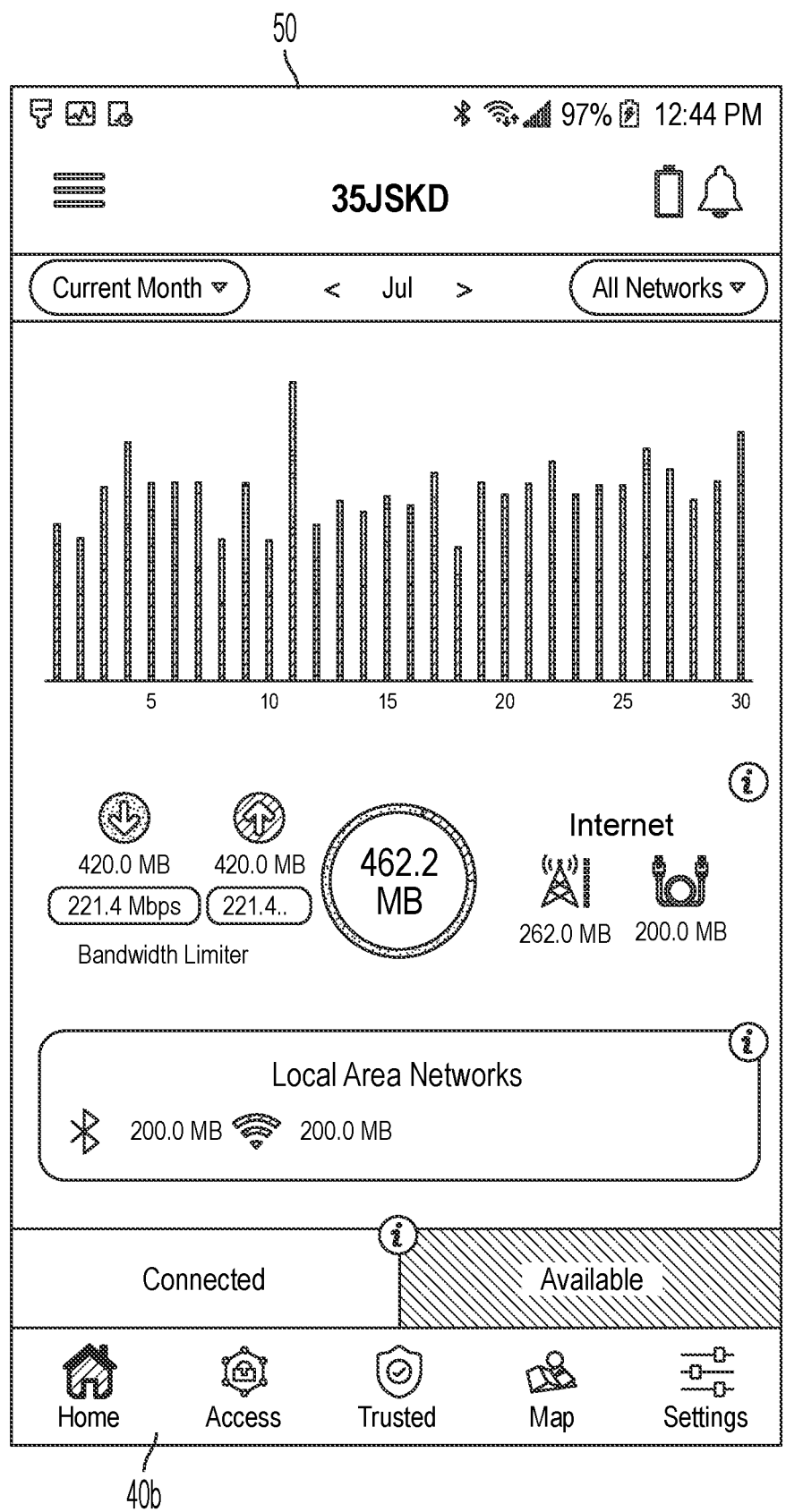
Figure 11C:
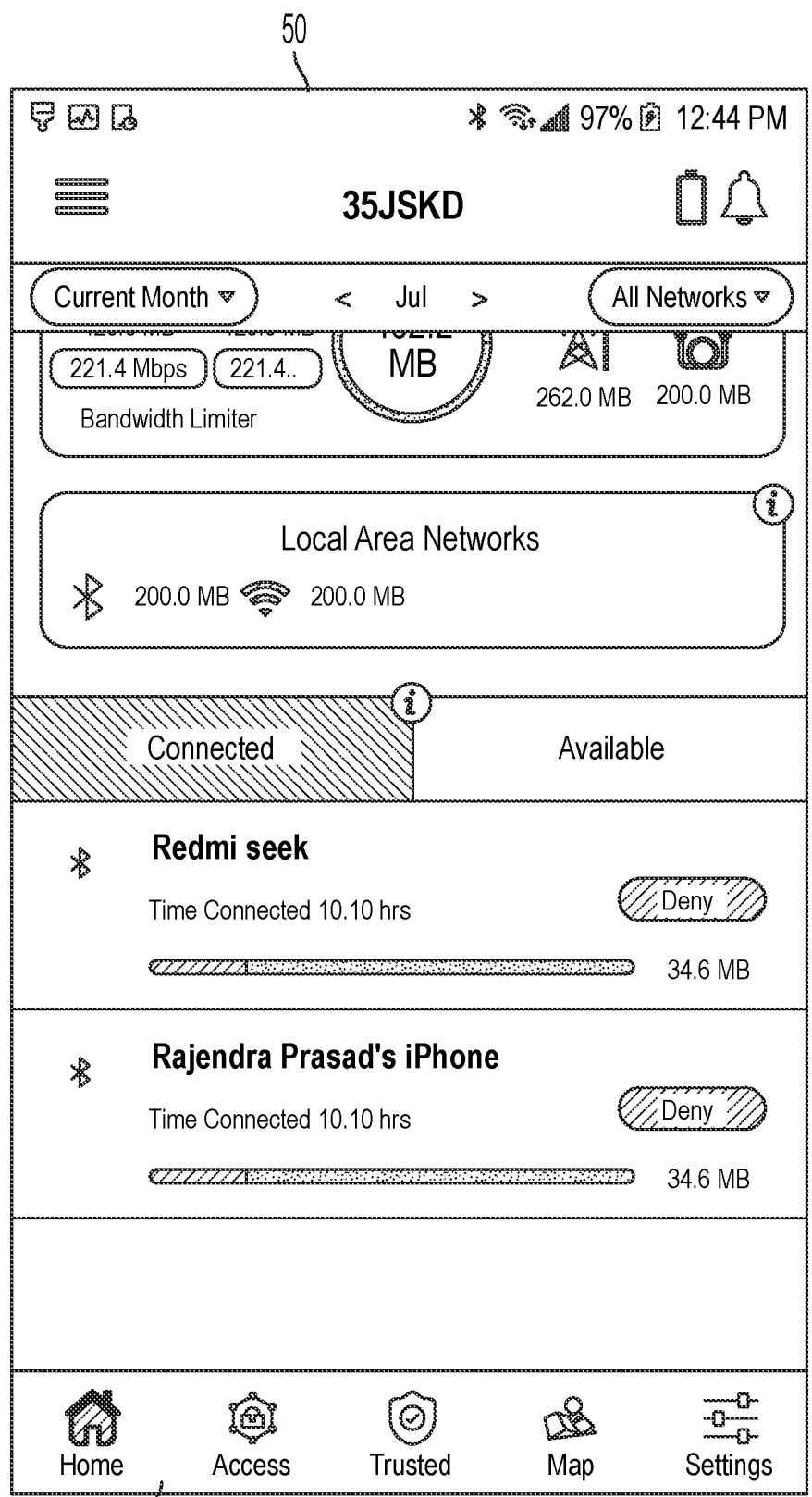

FIGS. 11B and 11C illustrate that the application 650 may also provide dashboard screens 40*b* and 40*c*, which show system information and the user's current level of data usage. The dashboard screens 40*b* and 40*c* provide some of the same information as provided at the display 30 of mobile security apparatus 20, including data seed, cellular status, network signal strength, and battery life. Data usage in an embodiment is for the user's overall smart endpoint device 50. The selectable buttons at the bottom of dashboard screens 40*b* and enable the user to return to a home interface, to monitor connected endpoint devices 50, to view CoT's, to update registration, and to change settings directly from the dashboard screen.

Figure 11D:
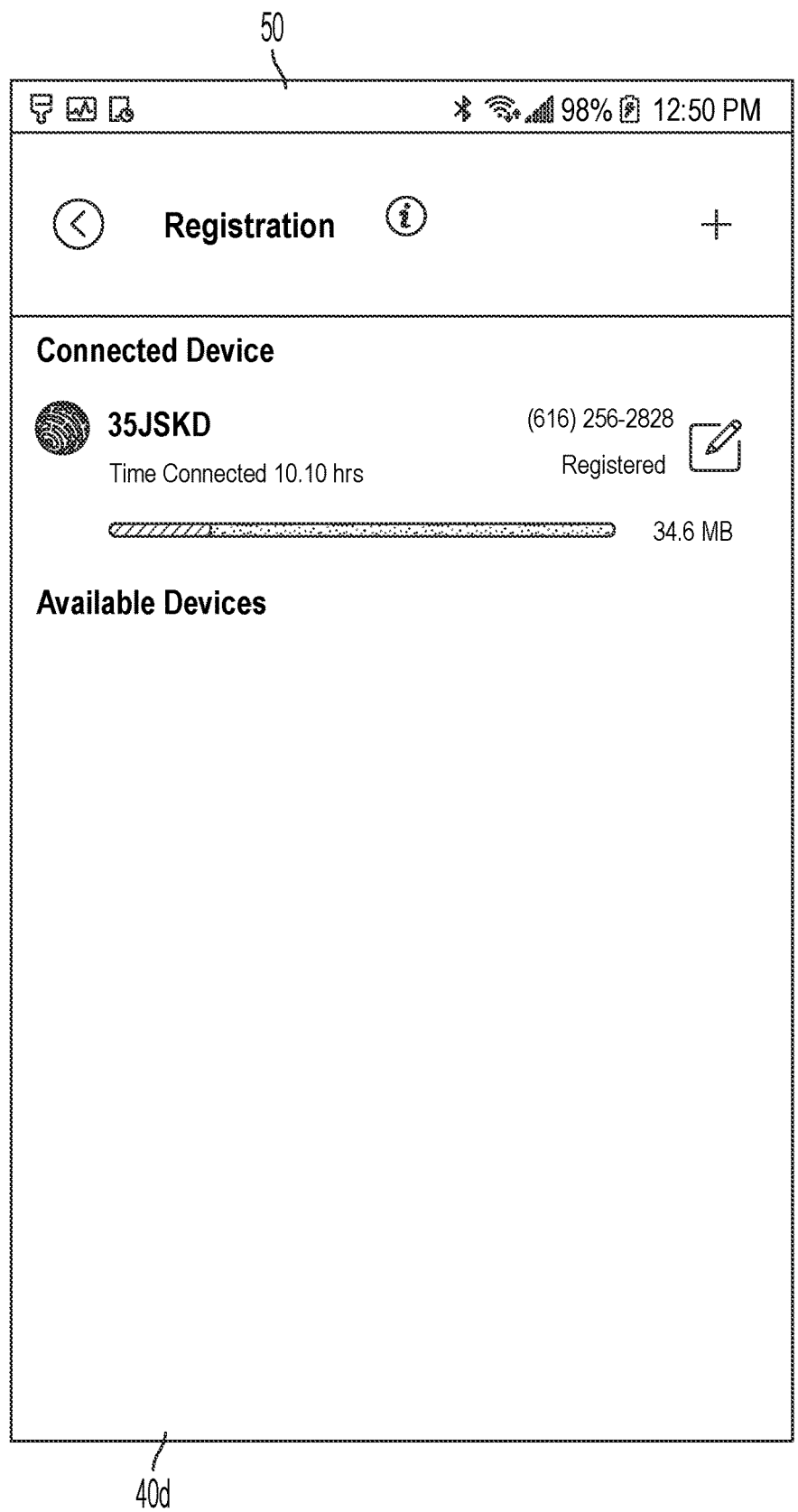

FIG. 11D illustrates that the application 650 may also provide a device registration status screen 40*d*, which is the same device registration as provided on the display 30 of FIG. 9A in one embodiment. The device registration enables a user to register their mobile security apparatus 20 with a cloud service, such as Amazon® Web Services ("AWS") that is provided by the management server 12. A registered mobile security apparatus 20 may add other registered mobile security apparatuses 20 and/or endpoint devices 50 to a designated CoT. The device registration status screen 40*d* in the illustrated embodiment provides the same selectable buttons as discussed at the bottom of the dashboard screen 40*b*.

Figure 11E:
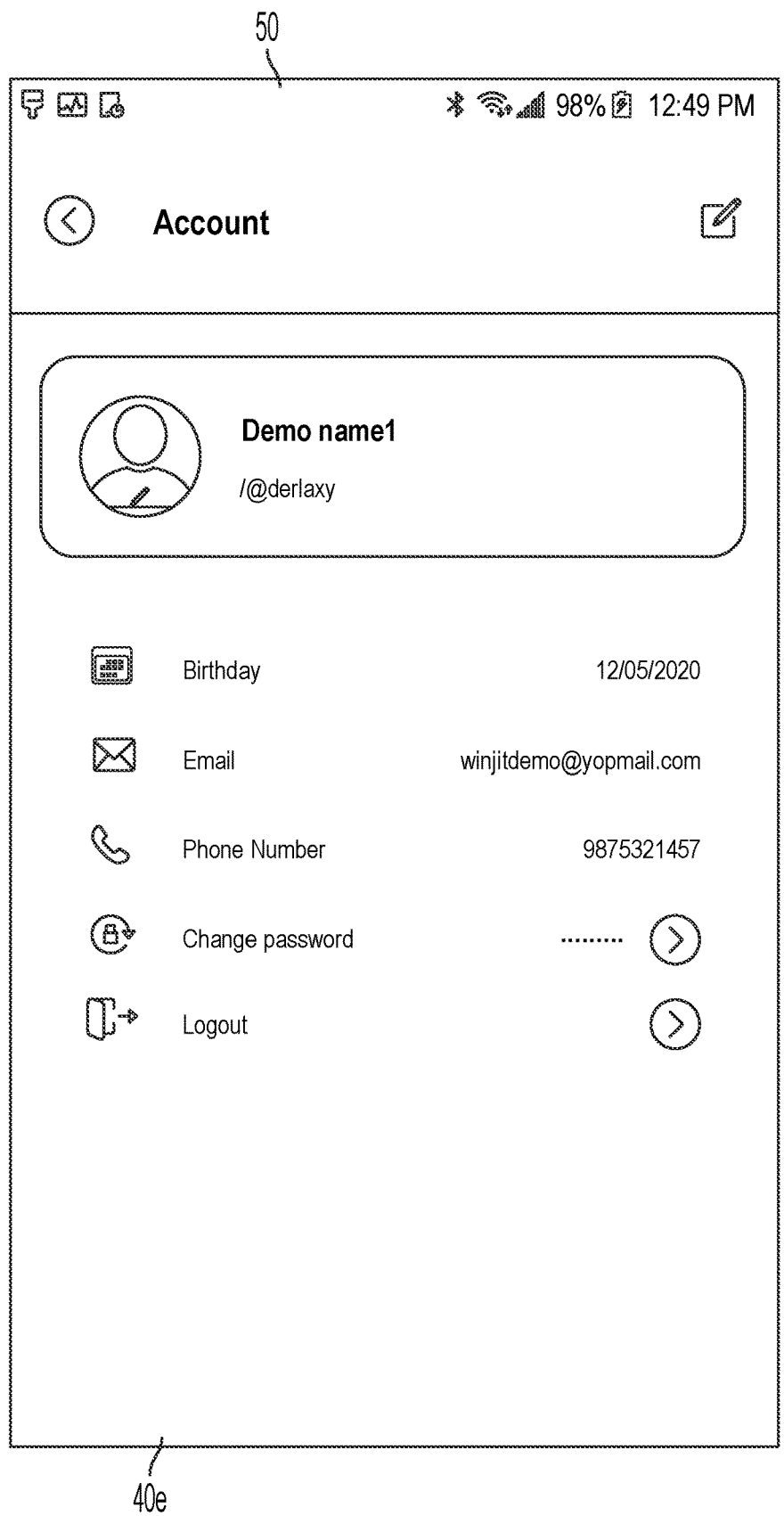

FIG. 11E illustrates that the application 650 may also provide a user account screen 40*e*, which shows user information and allows the user's desired password to be entered and changed for example. The user account screen 40*e* in the illustrated embodiment provides the same selectable buttons as discussed at the bottom of dashboard screen 40*b*.

Figure 11F:
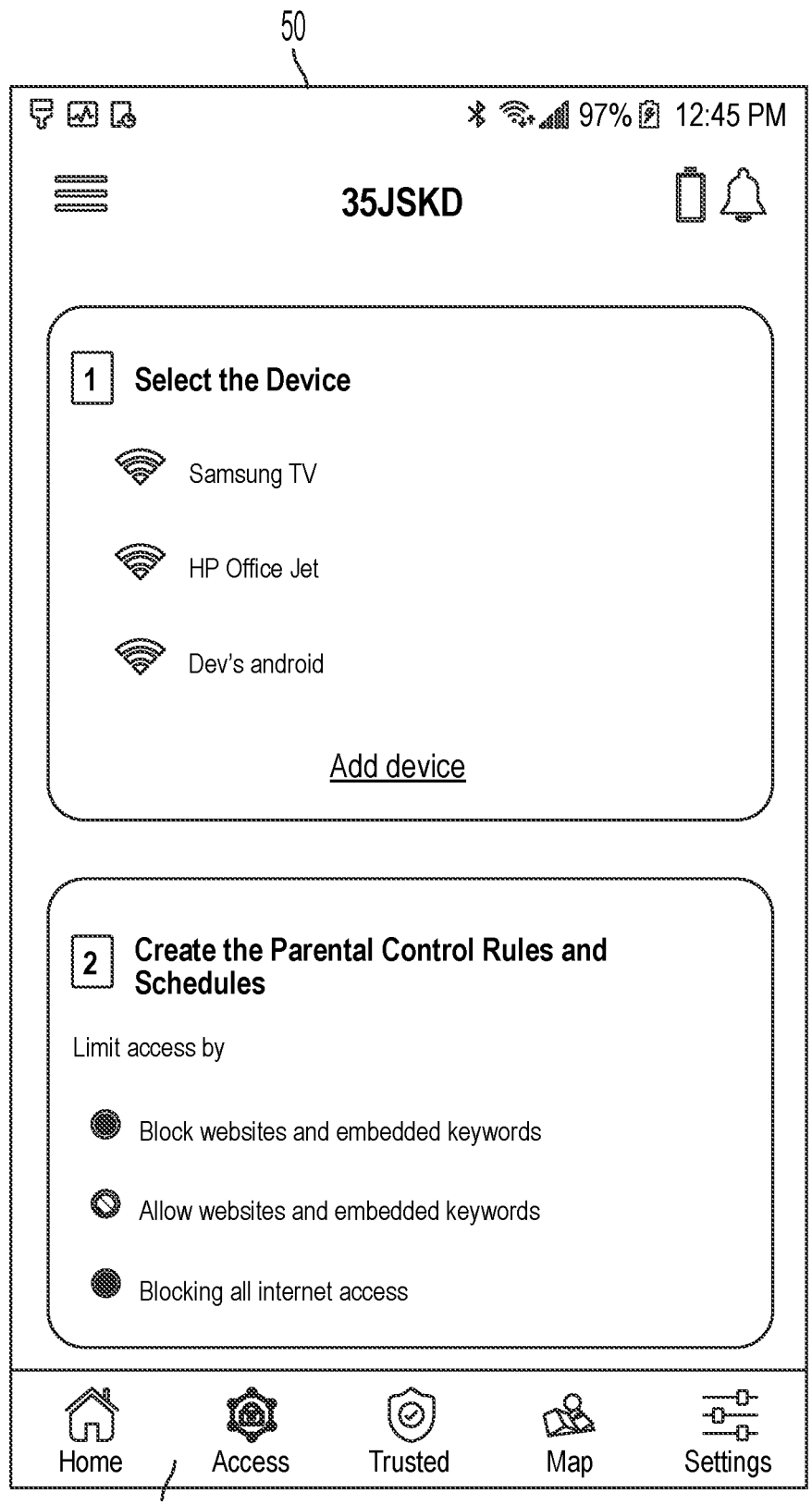
Figure 11G:
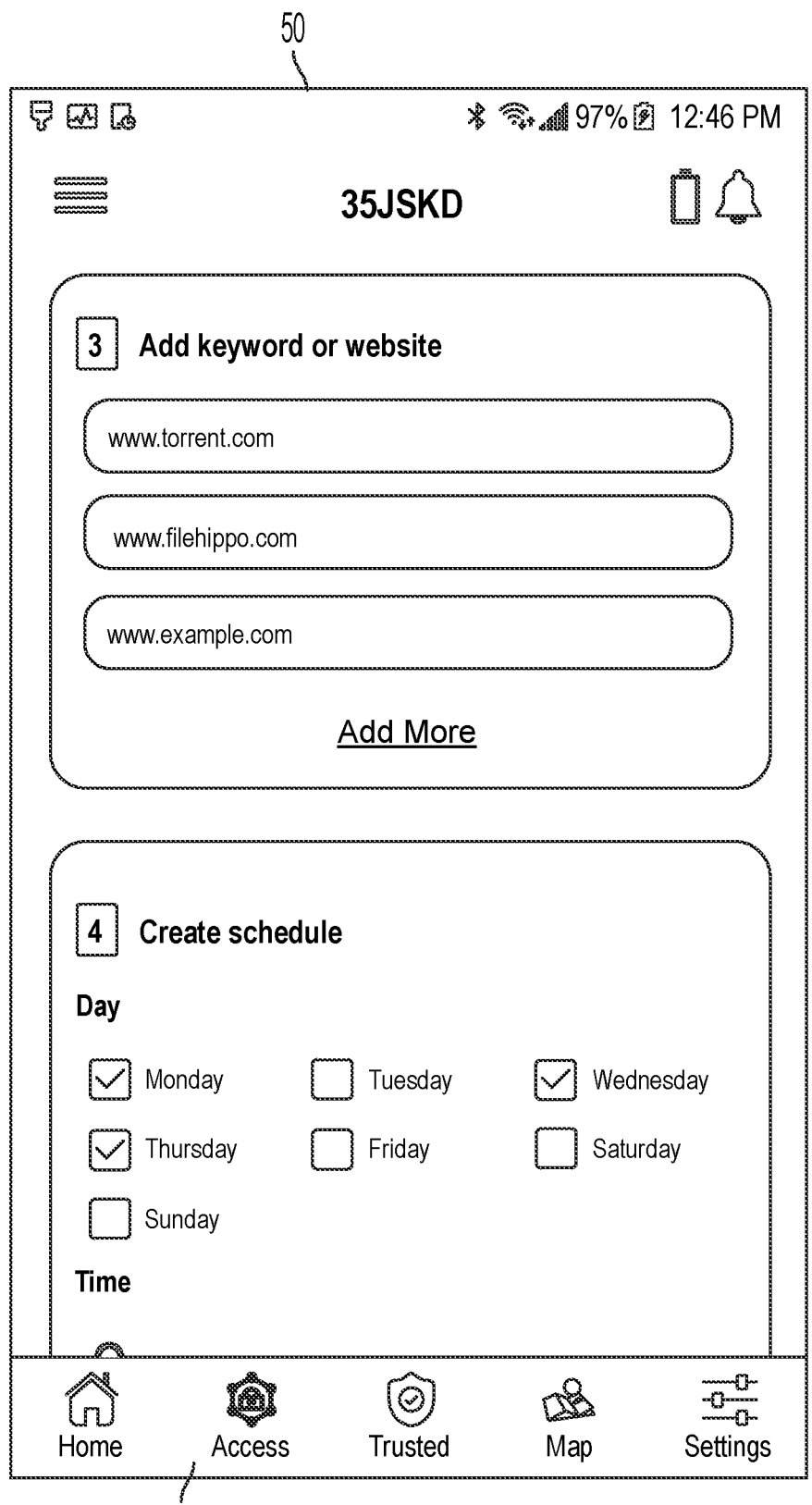
Figure 11H:
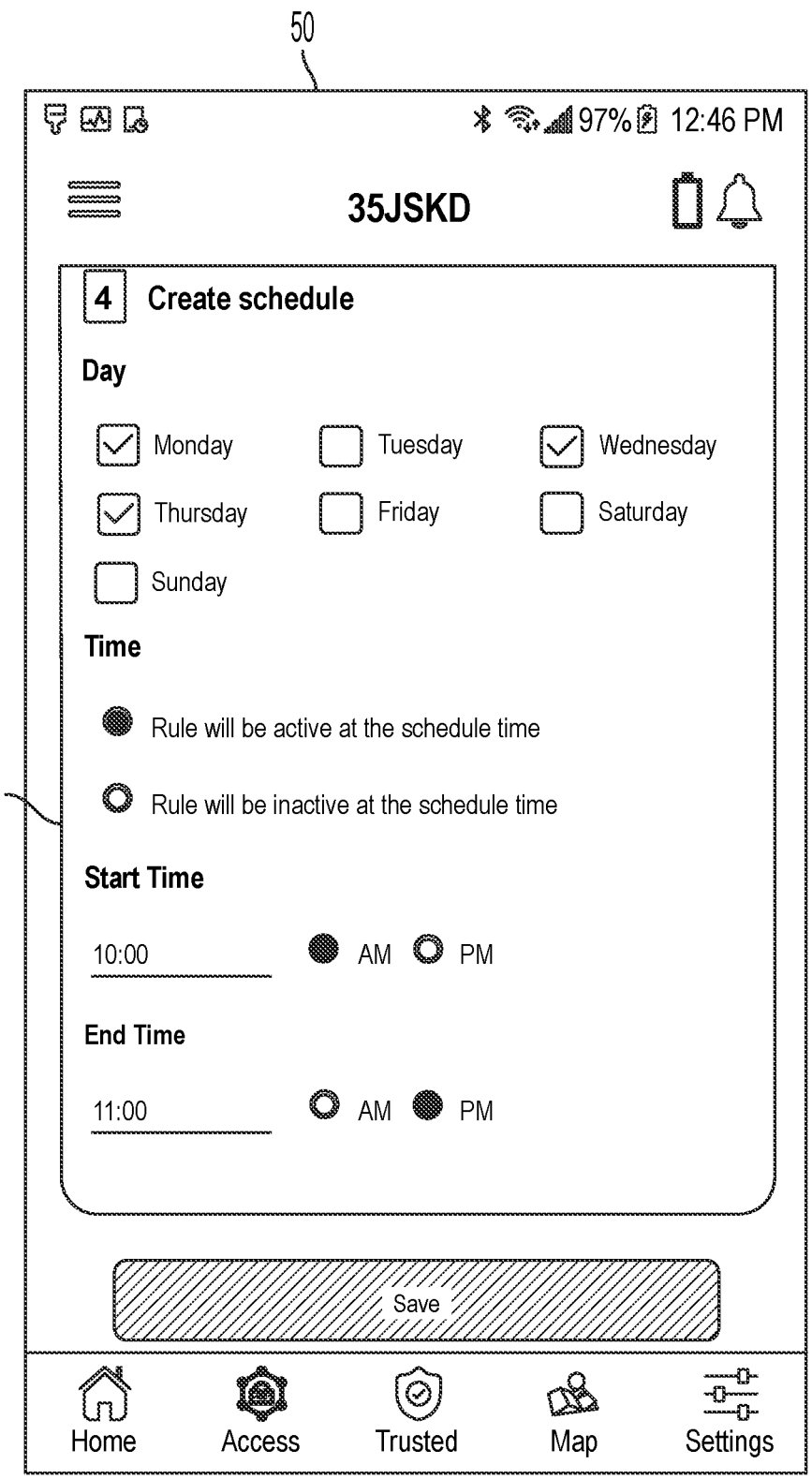

FIGS. 11F, 11G, and 11H illustrates that the application 650 may further provide device connection screens 40*f*, 40*g*, and 40*h*, which show each of endpoint devices 50 currently connected to and protected by the mobile security apparatus 20. The device connection screen 40*f* enables the user to select any of the endpoint devices 50 after which dedicated screens 40*g*, and 40*h* in FIGS. 11F, 11G, and 11H for the selected endpoint device is displayed. The dedicated screens 40*g* 40*h* enable, for example, a user to block certain websites for the selected endpoint device 50 and create a schedule when the endpoint device 50 can access the Internet through the mobile security apparatus 20.

Figure 11I:
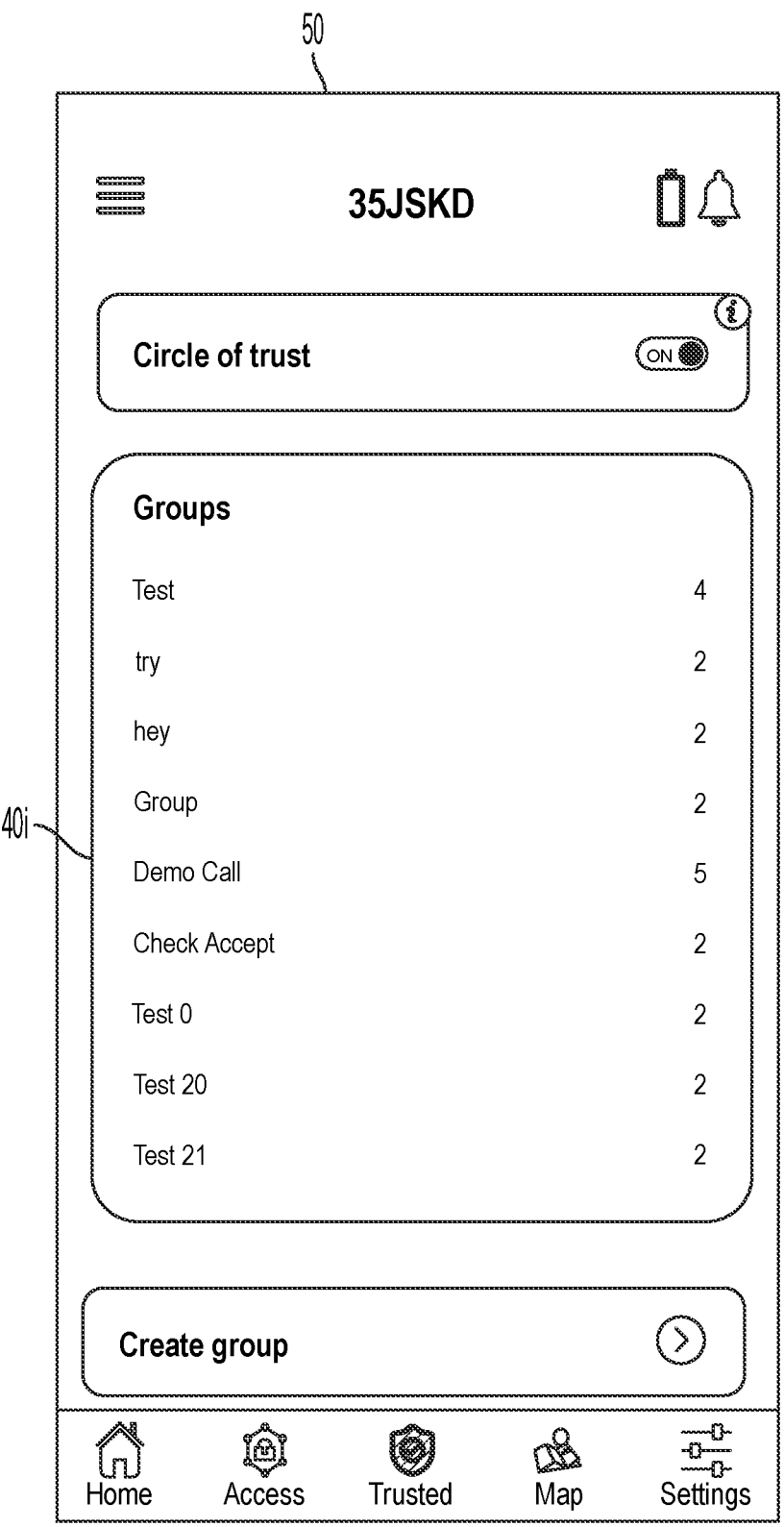

FIG. 11I illustrates that the application 650 may further provide a circle of trust ("CoT") screen 40*i*, which shows the user's current CoT's and enables the user to create new CoT's. The CoT's enable the user to share certain system information and/or files with other users using one or more encryption schemes via a TLS (or similar) connection. As discussed above, a first mobile security apparatus 20 receives a communication from a connected endpoint device 50, such as a file transfer. The first mobile security apparatus 20 determines that the communication includes a destination address, such as an IP address, of another endpoint device associated with a second mobile security apparatus 20 that is in the same CoT as the first mobile security apparatus 20. The first mobile security apparatus 20 accordingly encrypts the communication for transmission to the second mobile security apparatus 20. Since the second mobile security apparatus 20 is in the same CoT, it is configured to detect that the communication is from the first mobile security apparatus 20 (of a common CoT), decrypt the communication, and transmit the decrypted communication to the specified endpoint device 50. CoT screen 40*i* in the illustrated embodiment provides the same selectable buttons as discussed at the bottom of dashboard screen 40*b*.

Figure 11J:
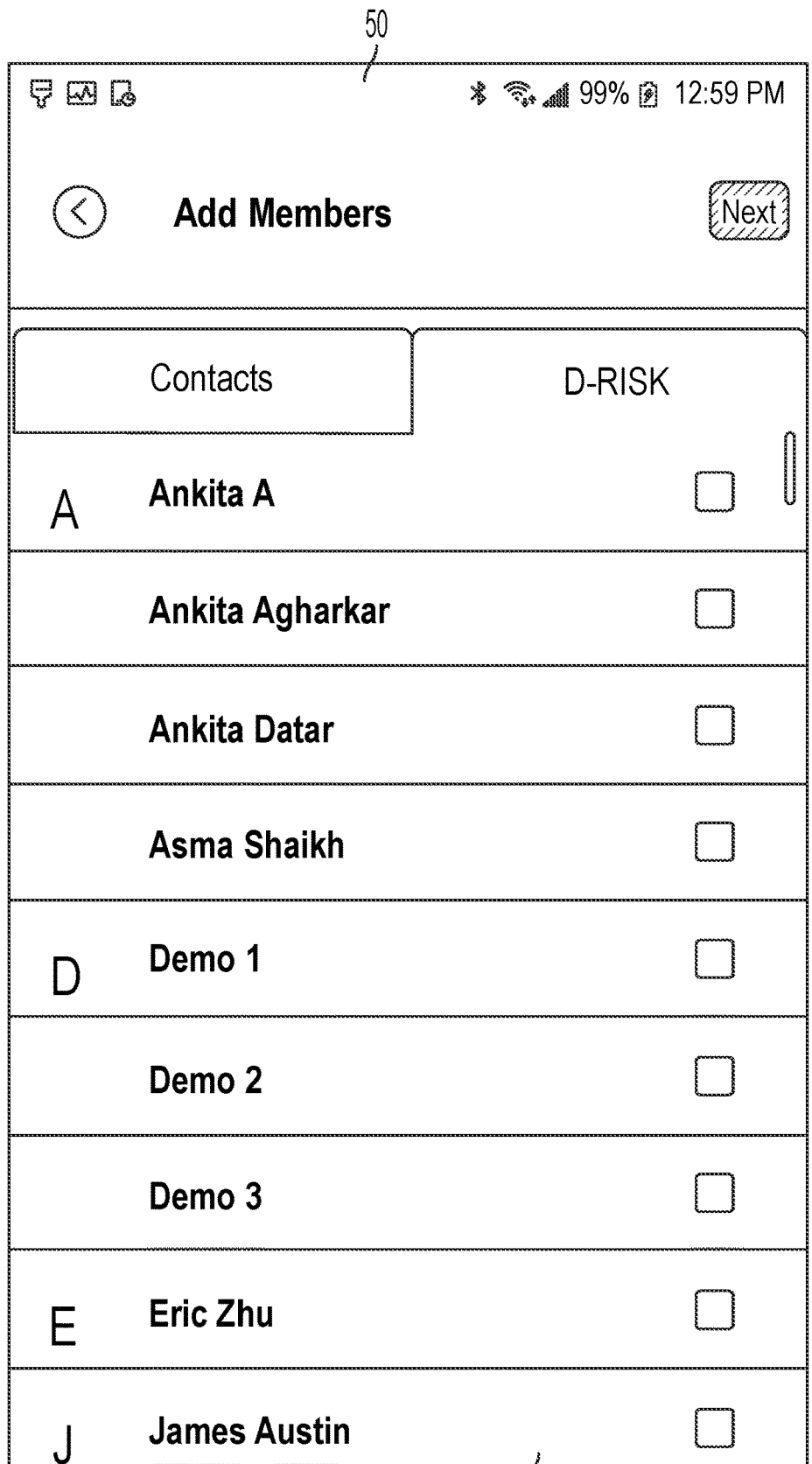
Figure 11K:
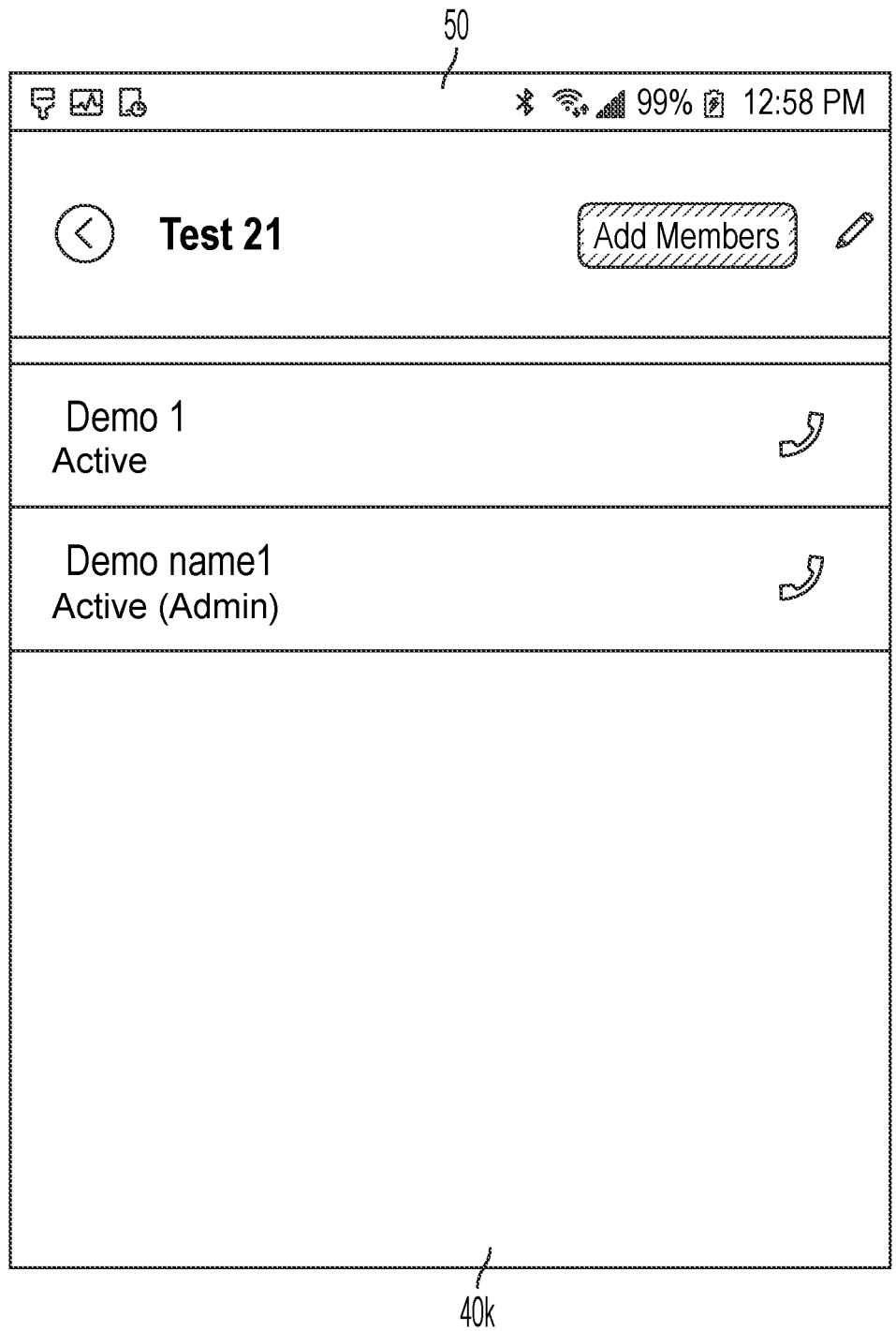

FIGS. 11J and 11K illustrate that the application 650 may also provide a plurality of CoT screens, e.g., screens 40*j* and 40*k*, having different tabs for adding a device to a group of a user's CoT from one or more contacts, e-Risk users, and/or social medial contacts. The CoT screens 40*j* and 40*k* in the illustrated embodiment provide the same selectable buttons as discussed at the bottom of dashboard screen 40*b*.

Figure 11L:
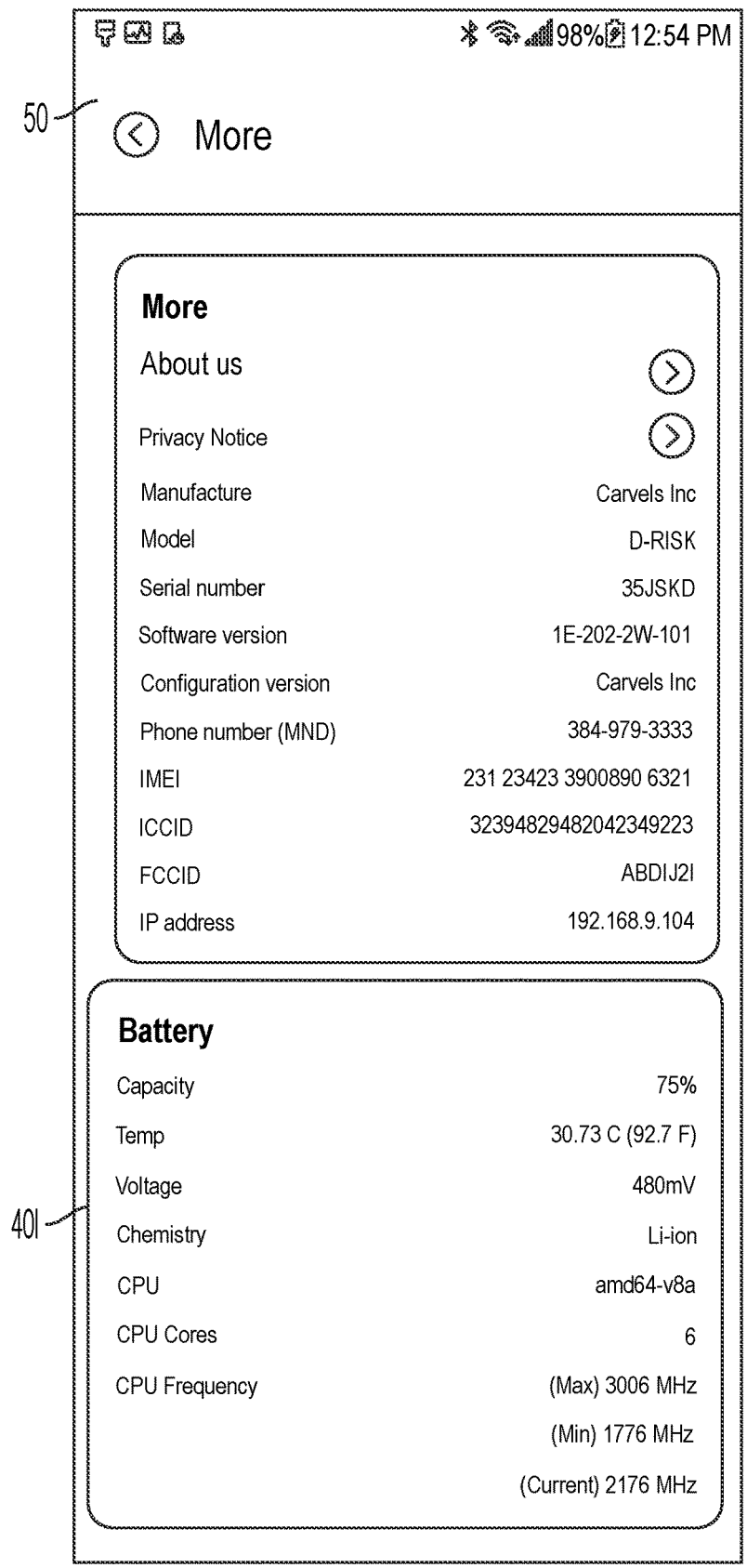

FIG. 11L illustrates that the application 650 may also provide an information screen 40*l* for the mobile security apparatus 20. The information screen 40*l* shows additional information for the mobile security apparatus 20 including company information, privacy information, manufacturer, model, serial number, software version, configuration version, company phone number, battery information, processor information, etc.

Figure 11M:
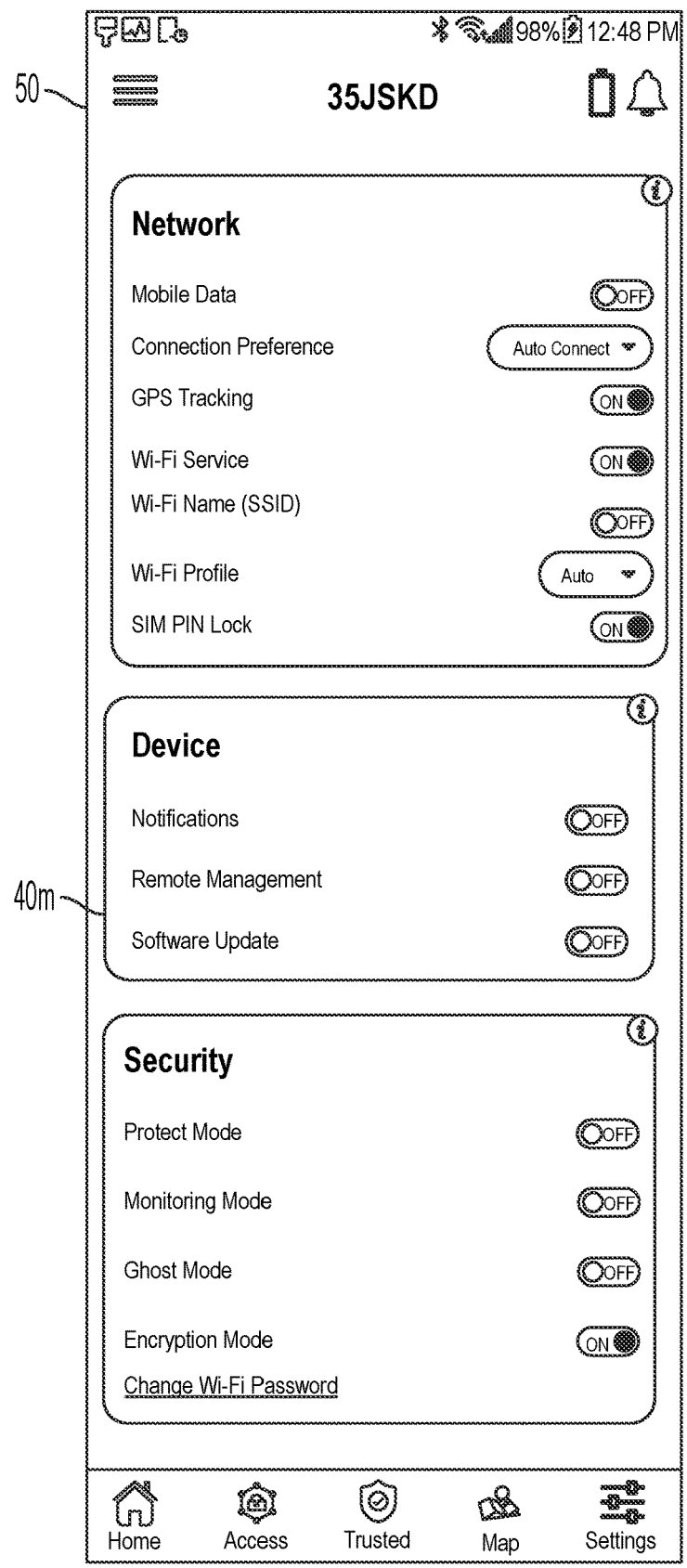

FIG. 11M illustrates that the application 650 may also provide a settings screen 40*m*. The settings screen 40*m* in the illustrated embodiment enables, for example, network (mobile data, connection preference, GPS tracking, Wi-Fi settings SIM settings), device (notifications, remote management, software updates) and security (protect mode, monitoring mode, ghost mode, encryption mode, and VPN)

settings to may be made. The settings screen in the illustrated embodiment provides the same selectable buttons as discussed at the bottom of dashboard screen 40*b*.

Figure 11N:
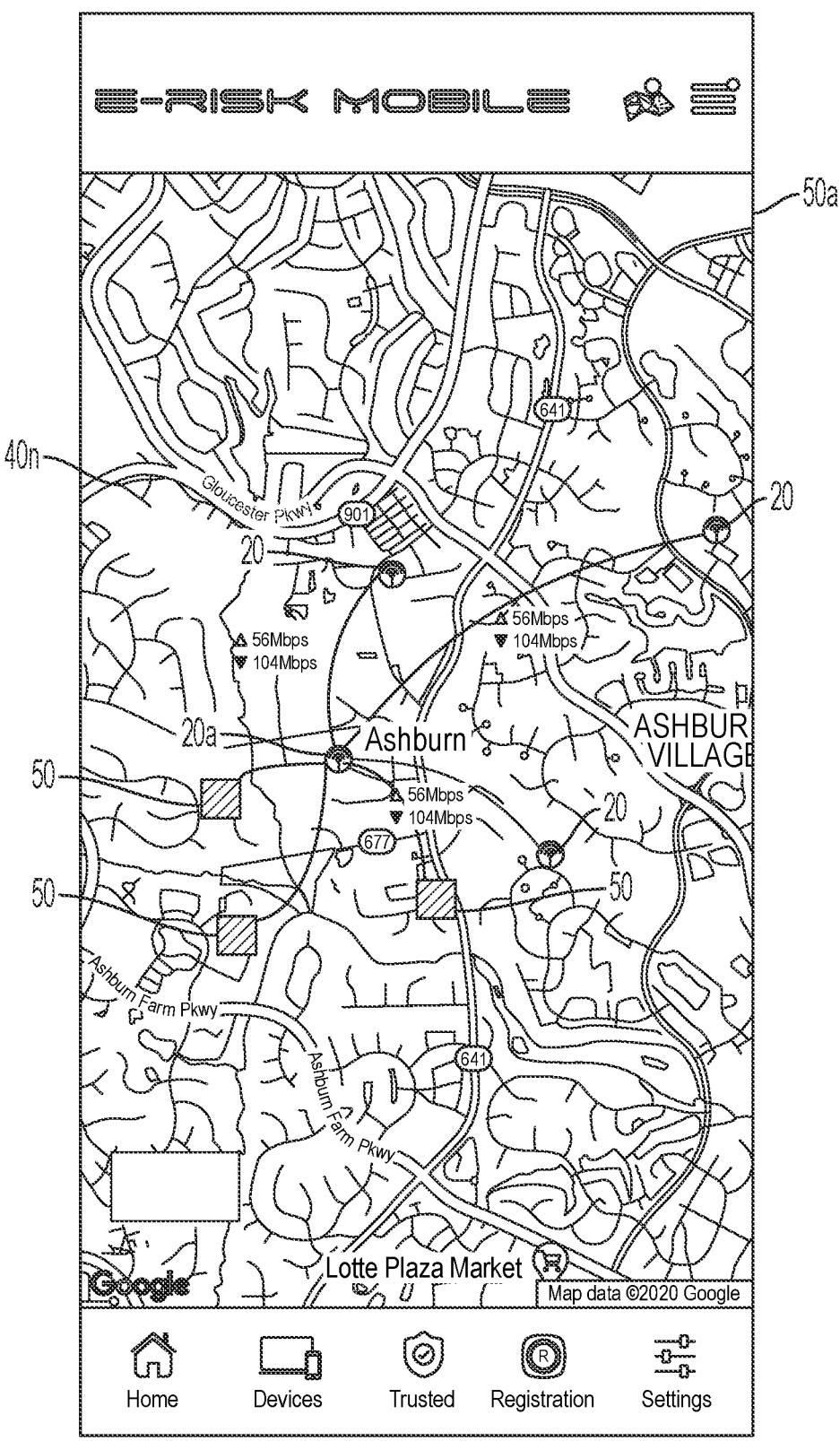

FIG. 11N illustrates that the application 650 may also provide a maps screen 40*n* on an endpoint device 50*a* showing real time locations for each of endpoint devices connected to mobile security apparatus 20*a* and associated system 10. In some examples, the map may show other mobile security apparatuses 20 that are in a same CoT. The CoT screen in the illustrated embodiment provides the same selectable buttons as discussed at the bottom of dashboard screen 40*b*. The application 650 and/or the mobile security apparatus 20 may use a geographic-location detection service to determine locations of connected endpoint devices 50 and other mobile security apparatuses 20 that are within a CoT.

Figure 11O:
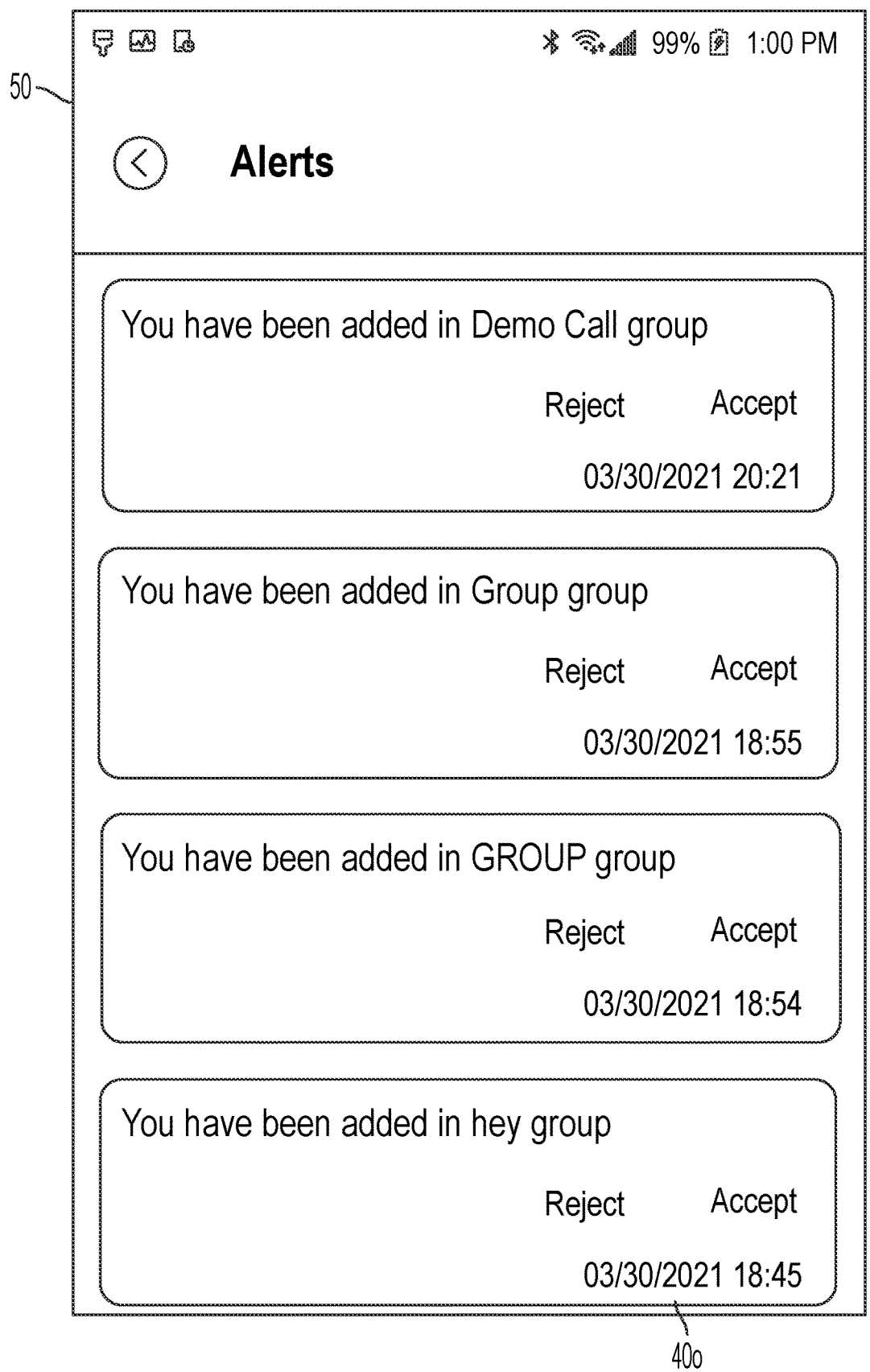

FIG. 11O illustrates that the application 650 may also provide a CoT notification screen 40*o*. The illustrated screen 40*o* provides a notification when a user is added to a CoT of another user. In an embodiment, the mobile security apparatus 20 of the other user or the management server 12 transmits a notification message indicative that the user was added to a CoT. The message identifies, for example, the other user and/or the CoT group name. The message is received in the mobile security apparatus 20 of the user, which is sent to the application 650 on the endpoint device 50. Additionally or alternatively, the display 30 of the mobile security apparatus 20 displays the notification. The user may accept or deny being added to the CoT. If the user denies being added, the mobile security apparatus 20 transmits a deny message to the management server 12 or the mobile security apparatus 20 of the other user. The deny message causes the mobile security apparatus 20 of the other user to prevent content from being transmitted to the mobile security apparatus 20 of the user.

Figure 11P:
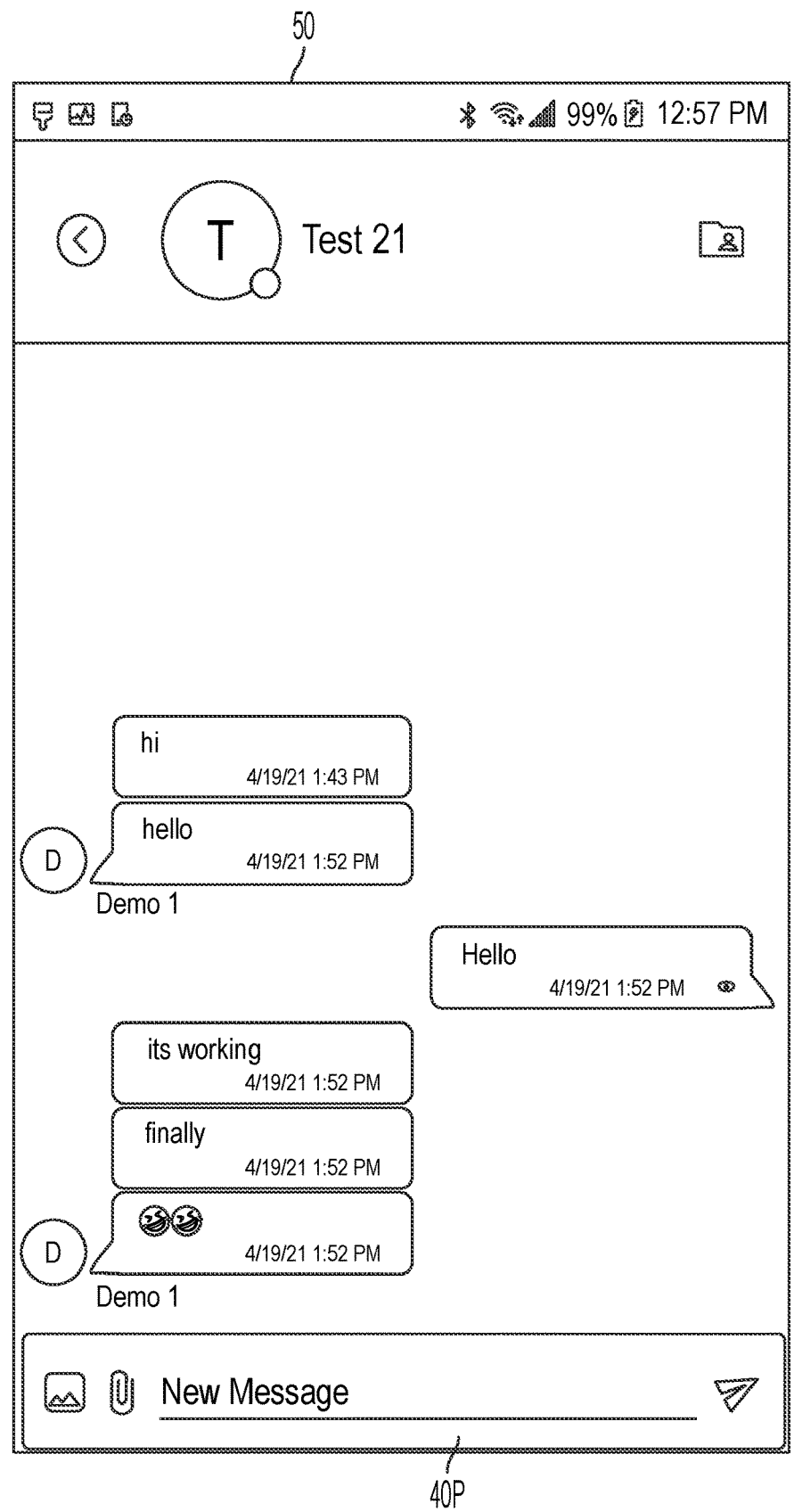

FIG. 11P illustrates that the application 650 may also provide a content sharing screen 40*p*. After a user has accepted being added to a CoT (or after the user has been added to a CoT), the content sharing screen 40*p* enables text messages, MMS messages, calls, etc. to be transmitted between the endpoint devices 50 of the users via their respective mobile security apparatuses 20. In the illustrated example, the content sharing screen 40*p* includes text and MMS messages transmitted between two users.

Figure 11Q:
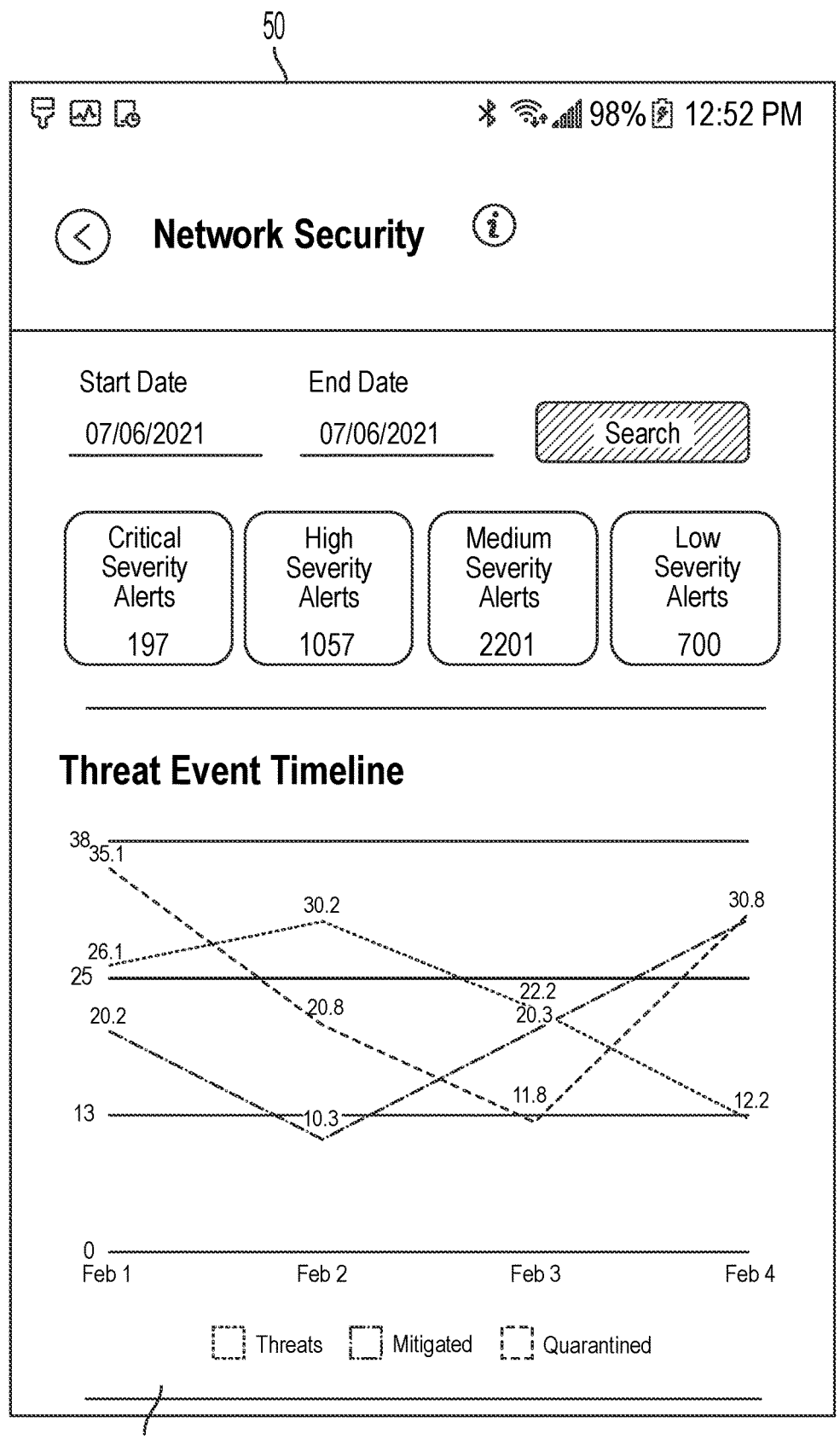
Figure 11R:
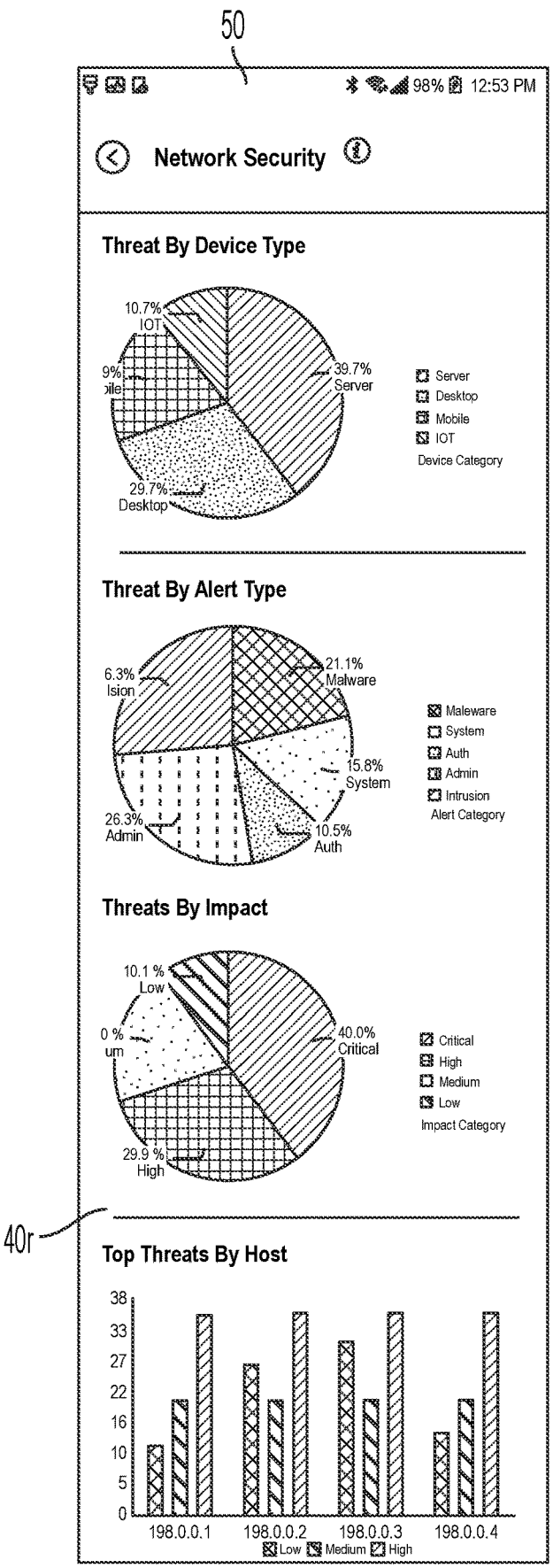
Figure 11S:
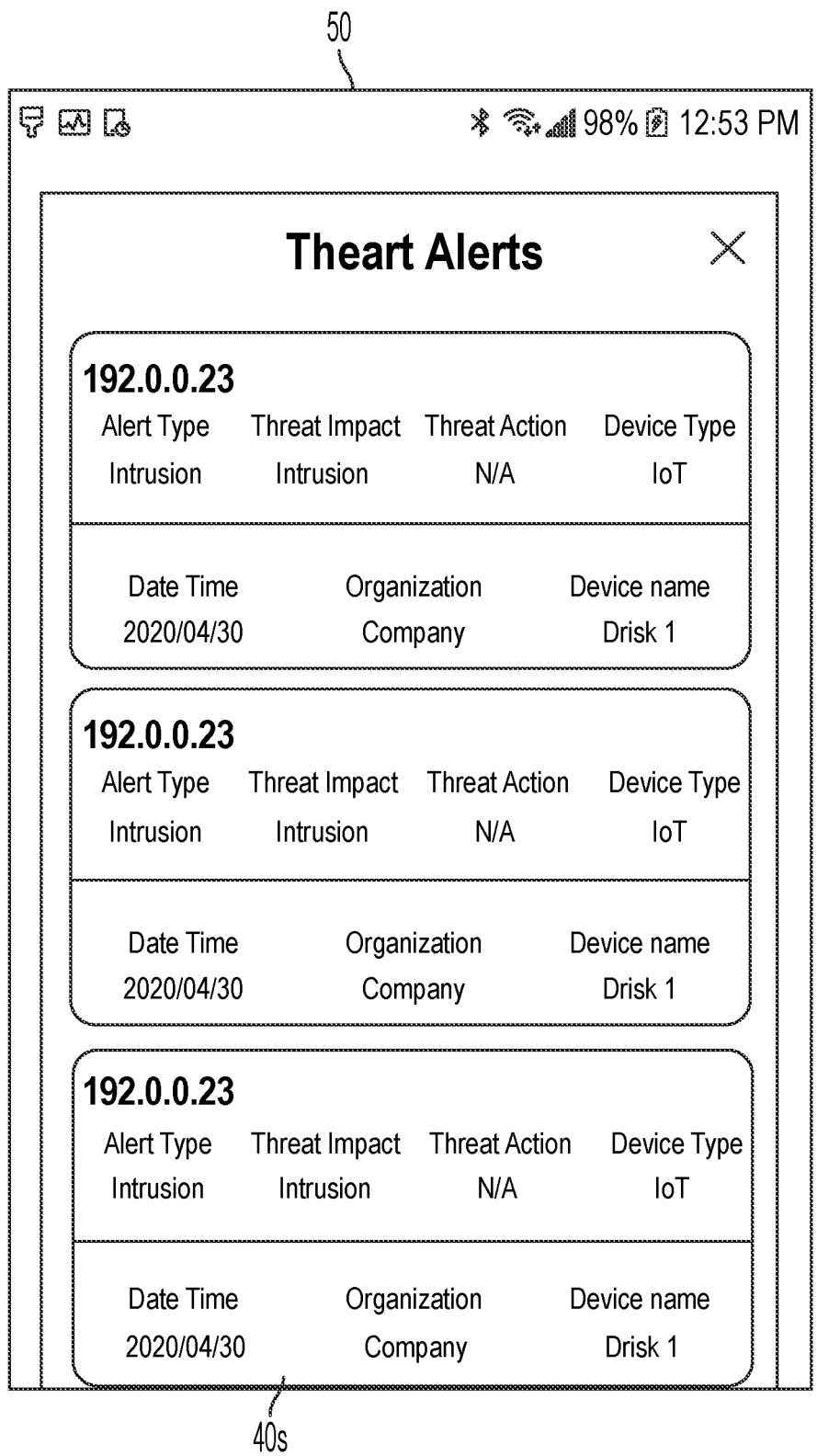

FIGS. 11Q, 11R, and 11S illustrate that the application 650 may also provide network security screens 40*q*, 40*r*, and 40*s*. As discussed herein, the mobile security apparatus 20 is configured to provide network security. The mobile security apparatus 20 is configured to log network security events, which are summarized within the network security screens 40*q* and 40*r*. The mobile security apparatus 20 identify a number of detected threats per day and which of those threats were mitigated of quarantined, as shown in the network security screen 40*q*. The mobile security apparatus 20 may also determine a severity of the threat. As shown in the network security screen 40*r*, the mobile security apparatus 20 determines threats by device type, by device type, and by impact. Further, as shown in the network security screen the mobile security apparatus 20 may determine a network address of the threatening device, an alert type, a threat impact, a threat action, a device time, a time of the threat, etc. In other embodiments, the device type indication may identify a target endpoint device 50 of the threat.

Figure 11T:
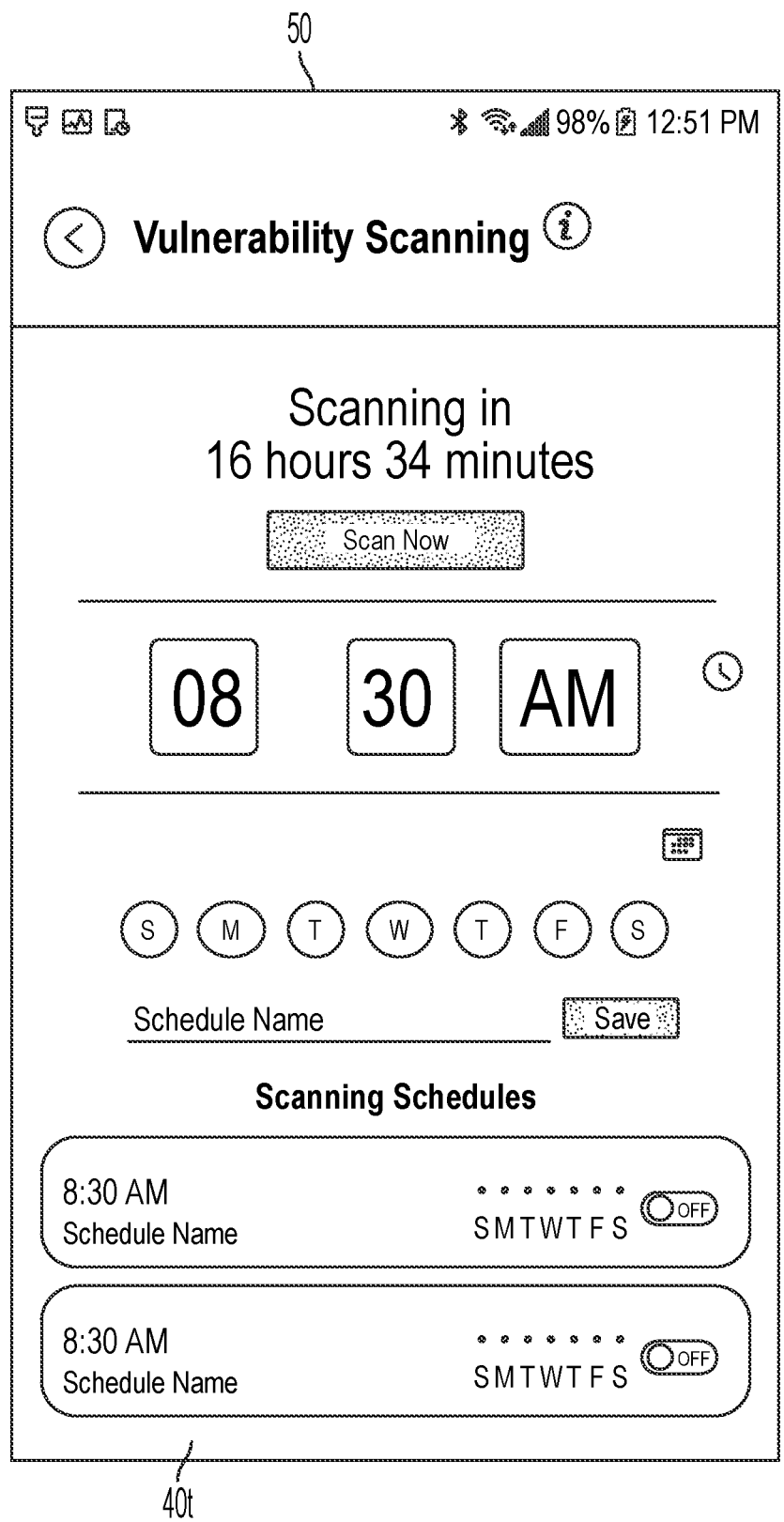

FIG. 11T illustrates that the application 650 may also provide a vulnerability scanning screen 40*t*. The example screen 40*t* enables a user to set a time/date when network vulnerability scans are performed by the mobile security apparatus 20. The settings entered by a user into the screen 40*t* cause the mobile security apparatus 20 to scan locally connected endpoint devices 50. A scan results screen provided by the application 650 may show identified vulnerabilities of one or more locally connected endpoint devices 50. The network vulnerabilities may include identified malware, unsecure administrator backdoors, use of common passwords, intrusion attempts, etc.

Secure Peer-to-Peer Communication Embodiment

Figure 13:
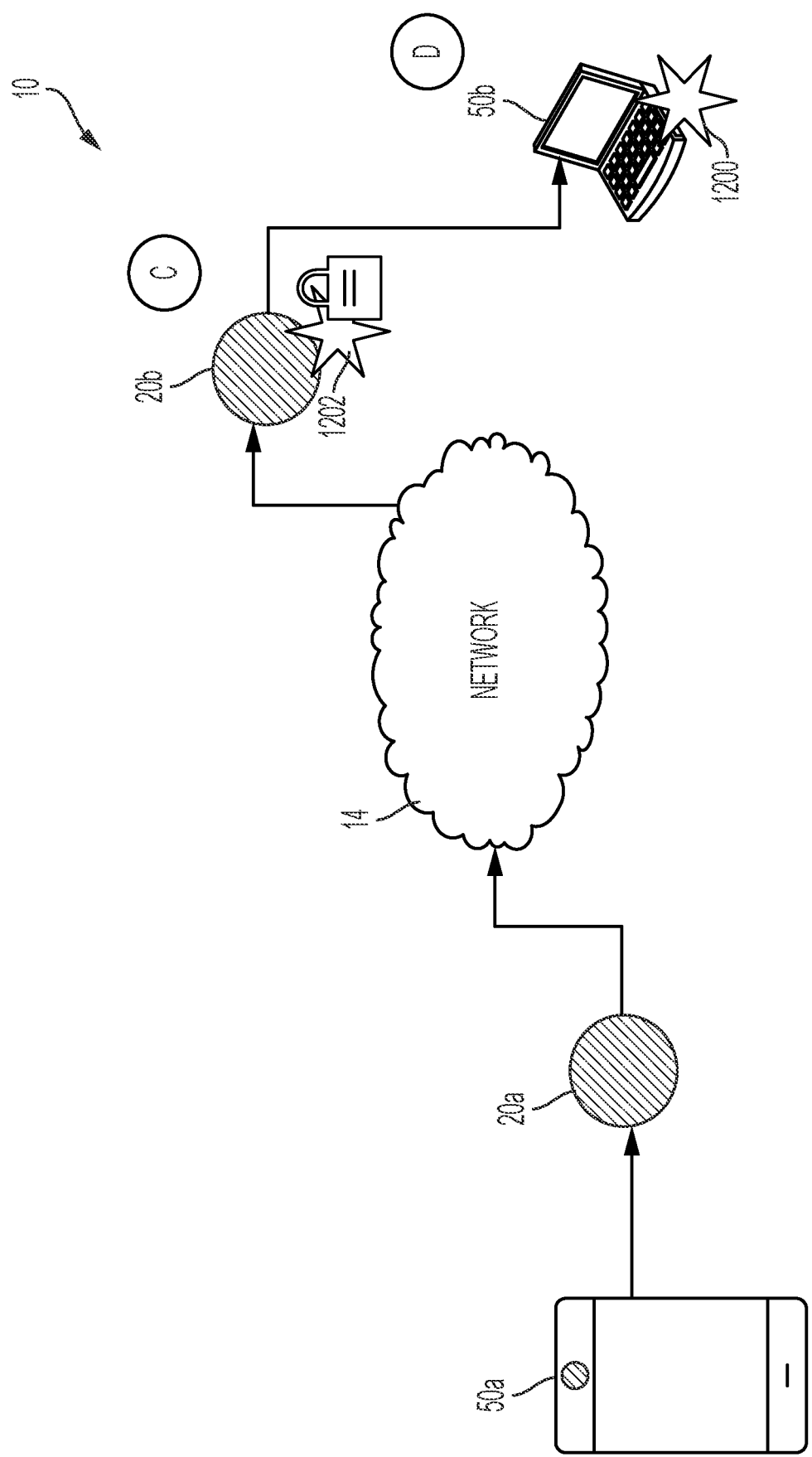

FIGS. 12 and 13 are diagrams that illustrate the exchange of content between mobile security apparatuses 20*a* and 20*b*, according to an example embodiment of the present disclosure. In the illustrated example, both mobile security apparatuses 20*a* and 20*b* are included at least within a CoT of the mobile security apparatus 20. Further, the endpoint device is listed within the CoT as being associated with the mobile security apparatus 20*b*.

At Event A, a user of the endpoint device 50*a* selects content 1200 for transmission to the endpoint device 50*b*. The content 1200 may include at least one of a file, a short message service ("SMS") or text message, a multimedia messaging service ("MMS") message, a voice call, an audiovisual call, or an e-mail. The content 1200 may be selected in an application operating on the endpoint device 50*a*. The application may include a SMS application, an MMS application, a voice call application, an email application, etc. To select the endpoint device 50*b*, the user selects a contact from a phone list, enters a phone number, enters a username, enters a MAC address, enters an email address, or enters any other identifying information. The endpoint device 50*a* transmits the content 1200 and the selected contact or identifier of the endpoint device 50*b* to the mobile security apparatus 20*a*.

At Event B, the mobile security apparatus 20*a* accesses the registration data structure 610 to determine that the specified contact information corresponds to the endpoint device 50*b* and/or the mobile security apparatus 20*b*. The mobile security apparatus 20*a* selects an IP address and a public key associated with the mobile security apparatus 20*b* that is stored in the memory device 602. The mobile security apparatus 20*a* encrypts the content 1200 to create encrypted content 1202 using the selected public key. The mobile security apparatus 20*a* then creates one or more messages for the transmission of the encrypted content 1202. The mobile security apparatus 20*a* specifies a destination IP address using the selected IP address of the mobile security apparatus 20. The mobile security apparatus 20*a* then transmits the one or more messages to the network 14.

At Event C, the network 14 uses one or more routers and/or switches to transmit the one or more messages to the mobile security apparatus 20*b* based on the destination address. The point-to-point or peer-to-peer communication provides a secure connection without pushing the messages or the content through a cloud service. Further, the use of encryption provides a TLS connection for authenticated and private communications between the mobile security apparatuses 20*a* and 20*b*. This may, for example, utilize TLS and a TCP/IP stack under Linux® on the mobile security apparatuses 20*a* and 20*b*.

The mobile security apparatus 20*b* receives the one or more messages containing the encrypted content 1202. The mobile security apparatus 20*b* identifies a source address as corresponding to the mobile security apparatus 20*a*. The mobile security apparatus determines that the messages originated from a trusted source and accordingly applies its private key to decrypt the messages.

In another example, the mobile security apparatus 20b is configured to apply its private key to all inbound messages. Messages that cannot be decrypted using the private key are indicative of the messages coming from a device outside of a CoT (e.g., devices that do not have a public key for the mobile security apparatus 20b), and are discarded accordingly. In such instance, the private key of the mobile security apparatus 20b successfully decrypts the messages, thereby releasing the content 1200.

At Event D, the mobile security apparatus 20b transmits the content 1200 to the endpoint device 50b. The content 1200 indicates, for example, a telephone number or other identifying information. The mobile security apparatus 20b compares the identifying information to a list of registered local endpoint devices to identify a destination. After identifying a match, the mobile security apparatus 20b uses local routing to transmit the content 1200 to the endpoint device 50b. At this point, the endpoint device 50b may display or otherwise play or store the received content 1200.

The example endpoint device 50b may transmit new content (such as reply text message) to the endpoint device 50a. In the illustrated example, the mobile security apparatus 20b may use its private key, while the mobile security apparatus 20a uses the public key of the mobile security apparatus 20b for encrypting/decrypting the content. In an alternative embodiment, the mobile security apparatus 20b uses a public key of the mobile security apparatus 20a. In such alternative embodiment, the mobile security apparatus 20a uses its private key for decrypting the content.

CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for provisioning secure peer-to-peer communication between separate endpoint devices, the system comprising:
    a server configured to maintain a data structure specifying credentials of mobile security apparatuses used for authentication;
    a first mobile security apparatus communicatively coupled to the server via a first network connection, the first mobile security apparatus authenticated with the server via first credentials, the first mobile security apparatus being communicatively coupled to a first endpoint device via a first local connection; and
    a second mobile security apparatus communicatively coupled to the server via a second network connection, the second mobile security apparatus authenticated with the server via second credentials, the second mobile security apparatus being communicatively coupled to a second endpoint device via a second local connection,
    wherein the server is configured to:
        store a registration of the first mobile security apparatus including a first Internet Protocol ("IP") address and a first public key,
        store a registration of the second mobile security apparatus including a second IP address and a second public key,
        receive a request message from the first mobile security apparatus indicative of a request to add the second mobile security apparatus to a circle-of-trust for secure peer-to-peer communication, and
        transmit a response message to the first mobile security apparatus including the second IP address and the second public key, and
    wherein the first mobile security apparatus is configured to:
        use the second IP address and the second public key to include the second mobile security apparatus and the corresponding second endpoint device within a circle-of-trust group for the first mobile security apparatus,
        receive content from the first endpoint device via the first local connection that is identified for transmission to the second endpoint device,
        determine the second endpoint device is associated with the second mobile security apparatus of the circle-of-trust group,
        encrypt the content from the first endpoint device with the second public key, and
        transmit the content to the second mobile security apparatus via a network using the second IP address for authenticated and private peer-to-peer communication, causing the second mobile security apparatus to decrypt the content using a second private key and transmit the decrypted content to the second endpoint device.

2. The system of claim 1, wherein the content includes at least one of a file, a short message service ("SMS") or text message, a multimedia messaging service ("MMS") message, a voice call, an audiovisual call, or an e-mail.

3. The system of claim 1, wherein the first mobile security apparatus is further configured to:
    receive encrypted second content from the second endpoint device via the second mobile security apparatus;
    determine the encrypted second content is from the second mobile security apparatus using a source IP address of the second content that matches the second IP address;
    decrypt the encrypted second content using the second public key;
    determine the second content is for the first endpoint device; and
    transmit the second content to the first endpoint device using the first local connection.

4. The system of claim 1, wherein the circle-of-trust group of the first mobile security apparatus includes at least one additional endpoint device and associated mobile security apparatuses, each mobile security apparatus of the circle-of-trust group corresponding to an IP address and a unique public key that are stored in the first mobile security apparatus for authenticated and private peer-to-peer communication.

5. The system of claim 1, wherein the circle-of-trust group of the first mobile security apparatus is a first circle-of-trust group, the first mobile security apparatus storing at least one additional circle-of-trust group,
    wherein each additional circle-of-trust group is associated with at least one endpoint device and a corresponding mobile security apparatus.

6. The system of claim 1, wherein the first network connection includes at least one of a wide area network connection or a cellular connection and the first local connection includes at least one of a Bluetooth®, a Zigbee™, a universal serial bus ("USB"), or a Wi-Fi connection, and
    wherein the second network connection includes at least one of a wide area network connection or a cellular connection and the second local connection includes at least one of a Bluetooth®, a Zigbee™, a USB, or a Wi-Fi connection.

7. The system of claim 1, wherein the first credentials include a first device serial number of the first mobile security apparatus associated with the first public key and the second credentials include a second device serial number of the second mobile security apparatus associated with the second public key.

8. The system of claim 7, wherein the first mobile security apparatus is provisioned with a first private key and a first certificate that are used for authentication with the server through correspondence with the first credentials, and
    wherein the second mobile security apparatus is provisioned with the second private key and a second certificate that are used for authentication with the server through correspondence with the second credentials.

9. The system of claim 1, wherein the first and second credentials are transmitted to the server via a manifest file from a manufacturer of the first and second mobile security apparatuses.

10. The system of claim 1, wherein the first credentials include a first signer and the first mobile security apparatus is provided with a first certificate that is signed by the first signer, and the second credentials include a second signer and the second mobile security apparatus is provided with a second certificate that is signed by the second signer.

11. The system of claim 10, wherein the first and second signers are the same signer.

12. The system of claim 10, wherein the server is configured to:
    receive the second certificate from the second mobile security apparatus;
    determine the second mobile security apparatus cannot be authenticated because there is no registration on file;
    after determining authentication has failed, use a script to verify the second signer of the second certificate received from the second mobile security apparatus matches the second signer of the second credentials for providing just-in-time registration; and
    use the just-in-time registration to authenticate the second mobile security apparatus, enabling the server to transmit the second IP address and the second public key of the second mobile security apparatus to the first mobile security apparatus for inclusion in the circle-of-trust group.

13. The system of claim 12, wherein the authentication includes transport layer security ("TLS") authentication.

14. A mobile security apparatus that is connected to a first endpoint device, the apparatus comprising:
    a memory device storing a list of mobile security apparatuses that are designated as being within a circle of trust of the mobile security apparatus, the list including an Internet Protocol ("IP") address, a public key, and an identifier of at least one endpoint device for each of the mobile security apparatuses;
    a secure element including a first private key; and
    a processor communicatively coupled to the memory device and the secure element, the processor configured to:
        receive, from the first endpoint device, a selection of content and a selection of a second endpoint device,
        determine that the second endpoint device corresponds to a second mobile security apparatus that is included within the circle of trust,
        encrypt at least one message including the content using the public key associated with the second mobile security apparatus, and
        transmit the encrypted at least one message using the IP address of the second mobile security apparatus, causing the second mobile security apparatus to decrypt the at least one message for transmission to the second endpoint device.

15. The apparatus of claim 14, wherein at least one of the first endpoint device or the second endpoint device includes at least one of a computing device, a smartphone, a tablet computer, a laptop computer, an Internet-of-Things ("IoT") device, or appliance.

16. The apparatus of claim 14, wherein the content includes at least one of a file, a short message service ("SMS") or text message, a multimedia messaging service ("MMS") message, a voice call, an audiovisual call, or an e-mail.

17. The apparatus of claim 14, wherein the processor is additionally configured to:
    receive at least one message from a third mobile security apparatus that lists the first mobile security apparatus within a circle of trust of the second mobile security apparatus, the at least one message encrypted with a public key associated with the mobile security apparatus;
    decrypt the at least one message using the private key stored within the secure element;
    determine the at least one message is to be routed to the first endpoint device; and
    transmit the at least one message to the first endpoint device.

18. The apparatus of claim 14, wherein the processor is additionally configured to:
    receive at least one message from the second mobile security apparatus, the at least one message encrypted with a second private key associated with the second mobile security apparatus;
    decrypt the at least one message using the public key associated with the second mobile security apparatus;
    determine that the at least one message is to be routed to the first endpoint device; and
    transmit the at least one message to the first endpoint device.

19. The apparatus of claim 14, wherein the processor is additionally configured to communicate with the second mobile security apparatus using a transport layer security ("TLS") connection.

20. The apparatus of claim 14, wherein the mobile security apparatus is connected to the first endpoint device via a local connection and is connected to the second mobile security apparatus via a network connection, and
    wherein the network connection includes at least one of a wide area network connection or a cellular connection and the local connection includes at least one of a Bluetooth®, a Zigbee™, a universal serial bus ("USB"), or a Wi-Fi connection.

* * * * *